US012798046B2

(12) United States Patent
Higashisaka et al.

(10) Patent No.: US 12,798,046 B2
(45) Date of Patent: Nov. 17, 2026

(54) INFORMATION PROCESSING APPARATUS

(71) Applicants: Sony Group Corporation, Tokyo (JP); Sony Semiconductor Solutions Corporation, Kanagawa (JP)

(72) Inventors: Tatsuya Higashisaka, Kanagawa (JP); Satoshi Ihara, Tokyo (JP); Masaru Ozaki, Chiba (JP); Yasuyuki Sato, Kanagawa (JP); Tomohiro Takahashi, Tokyo (JP)

(73) Assignees: Sony Group Corporation, Tokyo (JP); Sony Semiconductor Solutions Corporation, Kanagawa (JP)

( * ) Notice: Subject to any disclaimer, the term of this patent is extended or adjusted under 35 U.S.C. 154(b) by 621 days.

(21) Appl. No.: 18/546,983

(22) PCT Filed: Jan. 13, 2022

(86) PCT No.: PCT/JP2022/000819
§ 371 (c)(1),
(2) Date: Aug. 18, 2023

(87) PCT Pub. No.: WO2022/181098
PCT Pub. Date: Sep. 1, 2022

(65) Prior Publication Data

US 2024/0139907 A1 May 2, 2024

(30) Foreign Application Priority Data

Feb. 26, 2021 (JP) ................................ 2021-030435

(51) Int. Cl.
*B24B 49/12* (2006.01)
*G06V 20/40* (2022.01)
*H04N 23/95* (2023.01)

(52) U.S. Cl.
CPC .............. *B24B 49/12* (2013.01); *G06V 20/44* (2022.01); *H04N 23/95* (2023.01)

(58) Field of Classification Search
CPC ......... B24B 49/12; G06V 20/44; H04N 23/95
See application file for complete search history.

(56) References Cited

FOREIGN PATENT DOCUMENTS

JP S6215076 A * 1/1987
JP H07164318 A * 6/1995
(Continued)

OTHER PUBLICATIONS

International Search Report (PCT/ISA/210), International Application No. PCT/JP2022/000819, dated Mar. 22, 2022.

*Primary Examiner* — Andrew Schechter
*Assistant Examiner* — Kaleria Knox
(74) *Attorney, Agent, or Firm* — Michael Best & Friedrich LLP

(57) ABSTRACT

The present technology relates to an information processing apparatus capable of more easily determining a maintenance timing by using event data.

The information processing apparatus includes a state estimation unit that estimates a state of a grindstone by using event data supplied from an event sensor that outputs, as event data, a temporal change of an electrical signal obtained by photoelectrically converting an optical signal, and outputs a result of the estimation. The present technology can be applied to, for example, an information processing system or the like that tells a maintenance timing of a grindstone of a machine tool.

20 Claims, 17 Drawing Sheets

(56) References Cited

FOREIGN PATENT DOCUMENTS

| | | | | | |
|---|---|---|---|---|---|
| JP | H08323617 | A | | 12/1996 | |
| JP | 2003170344 | A | * | 6/2003 | |
| JP | 2019042857 | A | | 3/2019 | |
| JP | 2020114615 | A | | 7/2020 | |
| WO | WO-2015123931 | A1 | * | 8/2015 | ............. C22B 7/006 |
| WO | WO-2020170861 | A1 | * | 8/2020 | ............. H04N 25/50 |
| WO | WO-2020195770 | A1 | * | 10/2020 | ............. H04N 23/60 |

* cited by examiner

FIG. 7

| | | | SPARK | | | | COOLANT LIQUID DROPLET | | |
|---|---|---|---|---|---|---|---|---|---|
| | | | NUMBER | SIZE | SPEED | BURST MODE | NUMBER | SIZE | SPEED |
| WORKPIECE | | MATERIAL | ○ | | | ○ | | | |
| GRINDSTONE | ABRASIVE GRAIN | MATERIAL | ○ | ○ | | | | | |
| | | GRAIN SIZE | | + | | | | | |
| | BINDER | KIND | ○ | ○ | | | | | |
| | | DEGREE OF BINDING | + | | | | | | |
| | PORE | POROSITY | − | − | | | | | |
| PROCESSING CONDITION | | GRINDING PERIPHERAL SPEED | + | | + | | | | |
| | | FEED SPEED | + | + | | | | | |
| | | CUTTING AMOUNT | | + | | | | | |
| COOLANT | | OIL RATIO | + | | | | | | |
| | | FLOW RATE | − | | | | + | ○ | + |
| EXTERNAL ENVIRONMENT | | ILLUMINANCE | − | | | | − | | |

INFORMATION PROCESSING APPARATUS

TECHNICAL FIELD

The present technology relates to an information processing apparatus, and more particularly to an information processing apparatus capable of more easily determining a maintenance timing by using event data.

BACKGROUND ART

Patent Document 1 discloses a maintenance support device that generates a learning model by performing machine learning by using a learning data set in which actual surface roughness measured by an external measurement device is an objective variable and measurement data measured by an internal measurement device is an explanatory variable, and performs processing of supporting maintenance of a machine tool on the basis of measurement data obtained by an internal measurement device such as a non-contact displacement sensor.

CITATION LIST

Patent Document

Patent Document 1: Japanese Patent Application Laid-Open No. 2020-114615

SUMMARY OF THE INVENTION

Problems to be Solved by the Invention

It is desirable that a maintenance timing of a machine tool can be determined more easily.

The present technology has been made in view of such a situation, and makes it possible to more easily determine a maintenance timing by using event data.

Solutions to Problems

An information processing apparatus according to an aspect of the present technology includes a state estimation unit that estimates a state of a grindstone by using event data supplied from an event sensor that outputs, as event data, a temporal change of an electrical signal obtained by photoelectrically converting an optical signal, and outputs a result of the estimation.

According to the aspect of the present technology, a temporal change of an electrical signal obtained by photoelectrically converting an optical signal is output as event data, a state of a grindstone is estimated by using the event data, and a result of the estimation is output.

The information processing apparatus may be an independent device or may be a module incorporated in another device.

BRIEF DESCRIPTION OF DRAWINGS

FIG. 7 is a table illustrating a correlation between a measurement parameter and a physical quantity.

MODE FOR CARRYING OUT THE INVENTION

Figure 1:
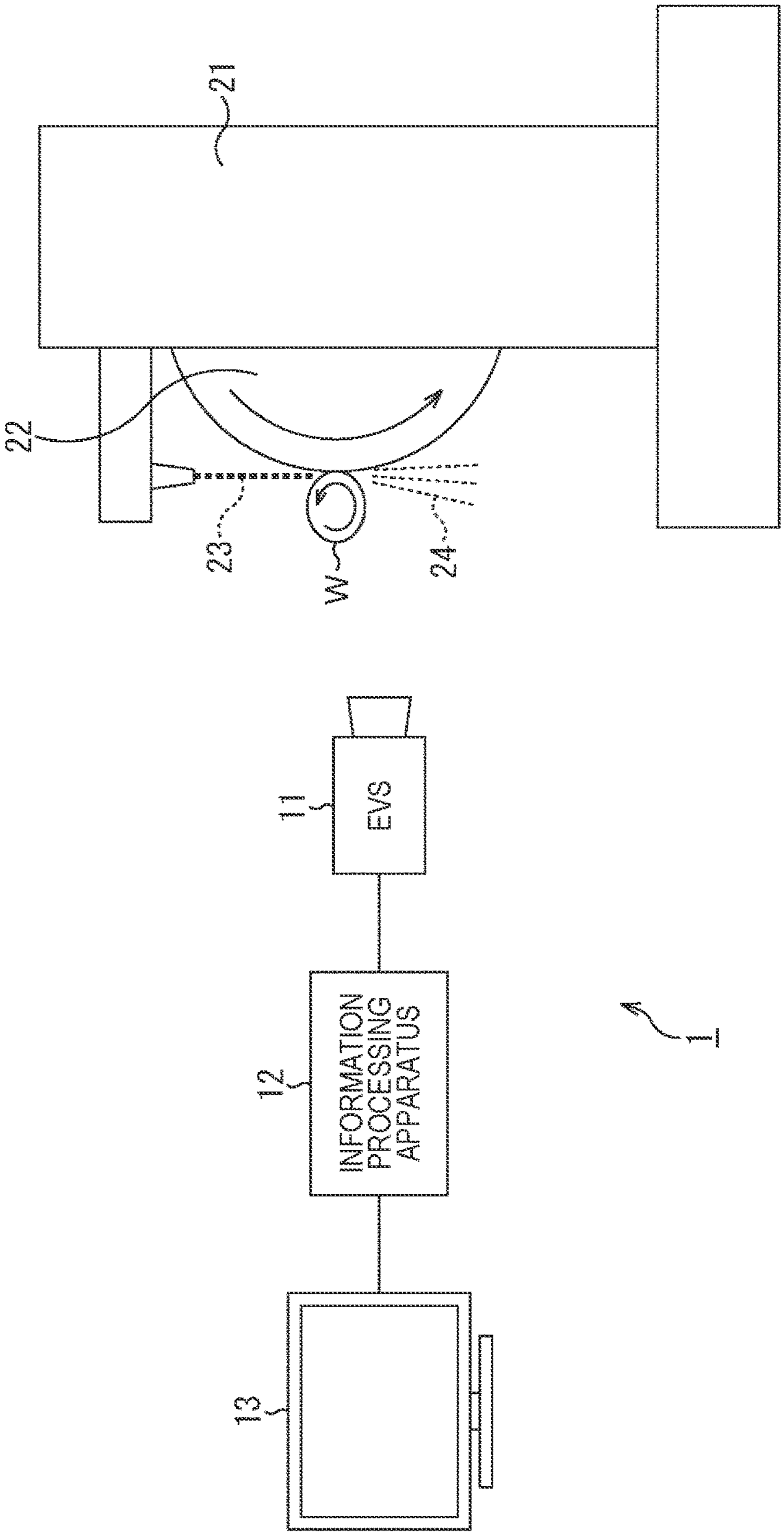
FIG. 1 is a block diagram illustrating a configuration example of a first embodiment of an information processing system to which the present technology is applied.

Hereinafter, embodiments for implementing the present technology (hereinafter, referred to as embodiments) will be described with reference to the accompanying drawings. Note that in the description and the drawings, components having substantially the same function and configuration are denoted by the same reference numerals, and redundant descriptions are omitted. The description will be made in the following order.

1. First embodiment of information processing system
2. Example of event data
3. Configuration example of information processing apparatus
4. Relationship between measurement parameter and physical quantity
5. Flowchart of maintenance timing determination processing
6. Flowchart of threshold update processing
7. Second embodiment of information processing system
8. Conclusion
9. Computer configuration example

1. First Embodiment of Information Processing System

FIG. 1 illustrates a configuration example of a first embodiment of an information processing system to which the present technology is applied.

An information processing system 1 of FIG. 1 is a system that includes an EVS camera 11, an information processing apparatus 12, and a display 13, estimates a state of a grindstone 22 of a machine tool 21, and tells a maintenance timing.

The machine tool 21 is a machine tool that performs grinding processing such as cylindrical grinding, inner surface grinding, and plane grinding on a workpiece W, and is a so-called grinding machine. The machine tool 21 rotates the grindstone 22 at a high speed to grind the workpiece W. A coolant liquid 23 is supplied from an upper nozzle to a contact portion between the grindstone 22 and the workpiece W. During the grinding of the workpiece W by the grindstone 22, a spark 24 is generated from the contact portion between the grindstone 22 and the workpiece W. In addition to the spark 24, a coolant liquid 23 also drops.

The EVS camera 11 is a camera including an event sensor that outputs, as event data, a temporal change of an electrical signal obtained by photoelectrically converting an optical signal. Such an event sensor is also referred to as an event-based vision sensor (EVS). While a camera including a general image sensor captures an image in synchronization with a vertical synchronization signal, and outputs frame data that is image data of one frame (screen) at a cycle of the vertical synchronization signal, the EVS camera 11 outputs event data only at a timing at which an event occurs. Therefore, it can be said that the EVS camera 11 is an asynchronous or address control camera.

The EVS camera 11 is installed so that an imaging range thereof includes the workpiece W and the grindstone 22 during the grinding process, detects, as an event, a change in light (luminance) caused by the spark 24 generated during the grinding and the coolant liquid 23 that drops, and outputs event data to the information processing apparatus 12.

The information processing apparatus 12 estimates the state of the grindstone 22 on the basis of the event data output from the EVS camera 11. For example, the information processing apparatus 12 determines whether or not the grindstone 22 is clogged by processing the event data. In a case where the information processing apparatus 12 determines that the grindstone 22 is clogged, the information processing apparatus 12 outputs an alert of occurrence of clogging of the grindstone 22. As the alert, any method such as outputting a sound such as a buzzer, turning on a signaling light, or displaying an alert message may be selected. In the present embodiment, the information processing apparatus 12 causes the display 13 to display a message (text) such as "Clogging has occurred. Maintenance is needed." Furthermore, the information processing apparatus 12 generates a display image using the event data output from the EVS camera 11 and causes the display 13 to display the display image.

2. Example of Event Data

Figure 2:
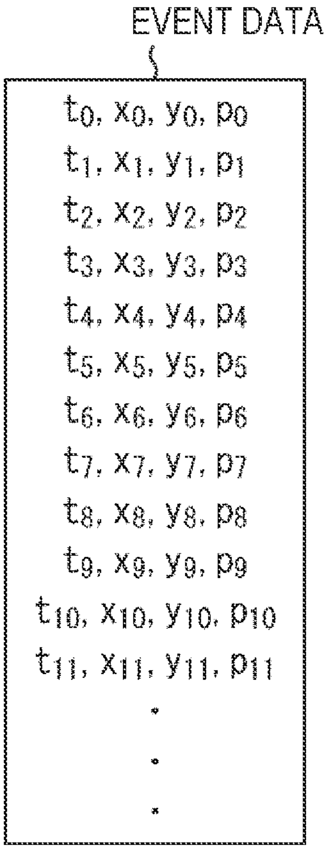
FIG. 2 is a diagram illustrating an example of event data.

FIG. 2 illustrates an example of event data outputted by the EVS camera 11.

For example, as illustrated in FIG. 2, the EVS camera 11 outputs event data including a time $t_i$ at which an event has occurred, coordinates $(x_i, y_i)$ representing a position of a pixel at which the event has occurred, and a polarity $p_i$ of a luminance change as the event.

The time $t_i$ of the event is a time stamp indicating a time when the event occurs, and is represented by, for example, a count value of a counter based on a predetermined clock signal in a sensor. It can be said that the time stamp corresponding to the timing at which the event has occurred is time information indicating the (relative) time at which the event has occurred, as long as an interval between events is maintained as it is at the time of occurrence of the event.

The polarity $p_i$ represents a direction of a luminance change in a case where a luminance change (a light amount change) exceeding a predetermined threshold value (hereinafter referred to as an event threshold value) occurs as an event, and indicates whether the luminance change is a change in a positive direction (hereinafter, also referred to as positive) or a change in a negative direction (hereinafter, also referred to as negative). The polarity $p_i$ of the event is, for example, represented as "1" in a case of positive, and represented as "0" in a case of negative.

In the event data of FIG. 2, an interval between the time $t_i$ of a certain event and a time $t_{i+1}$ of an event adjacent to the event is not necessarily constant. That is, the time $t_i$ and the time $t_{i-1}$ of the events may be the same time or different times. However, it is assumed that there is a relationship represented by an expression $t_i <= t_{i+1}$ for the times $t_i$ and $t_{i+1}$ of the events.

The EVS camera 11 outputs only the position coordinates of the pixel in which the luminance change is detected, the polarity, and the time information. Since the EVS camera 11 generates and outputs only a net change (difference) of the position coordinates, the polarity, and the time information, there is no redundancy in an information amount of the data, and has high temporal resolution on the order of μsec. Therefore, the spark 24, the coolant liquid 23, and the like that are instantaneously generated can be accurately captured.

The event data is outputted every time an event occurs, unlike image data (frame data) in a frame format outputted in a frame cycle in synchronization with a vertical synchronization signal. Therefore, the event data as it is cannot be displayed as an image by the display 13 that displays an image corresponding to the frame data, and cannot be used for image processing by being inputted to an identifier (a classifier). To display the event data on the display 13, the event data needs to be converted into frame data.

Figure 3:
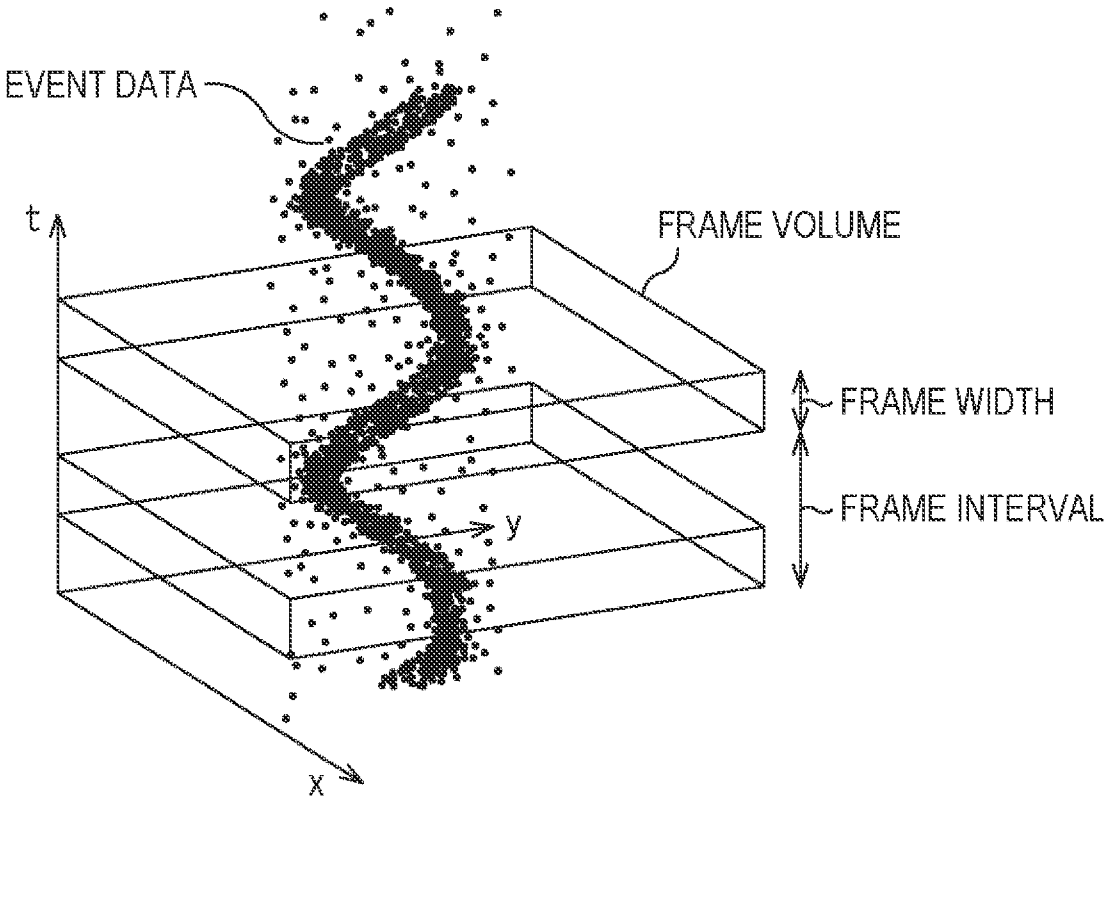
FIG. 3 is a view for explaining an example of a method of generating frame data from event data.

FIG. 3 is a view for explaining an example of a method of generating frame data from event data.

In FIG. 3, in a three-dimensional (time) space including an x axis, a y axis, and a time axis t, points as event data are plotted at the time t of an event included in the event data and coordinates (x, y) as pixels of the event.

That is, assuming that the position (x, y, t) in the three-dimensional space represented by the time t of the event included in the event data and the pixel (x, y) of the event is referred to as a spatiotemporal position of the event, event data is plotted as points at the spatiotemporal position of the event (x, y, t), in FIG. 3.

By using the event data outputted from the EVS camera 11 as a pixel value, an event image can be generated using event data within a predetermined frame width from the beginning of a predetermined frame interval for every predetermined frame interval.

The frame width and the frame interval can be designated by time or designated by the number of pieces of event data. One of the frame width and the frame interval may be designated by time, and another may be designated by the number of pieces of event data.

Here, in a case where the frame width and the frame interval are designated by time, and the frame width and the frame interval are the same, the frame volume is in a state of being in contact with each other without a gap. Furthermore, in a case where the frame interval is larger than the frame width, the frame volume is in a state of being arranged with a gap. In a case where the frame width is larger than the frame interval, the frame volume in a state of being arranged in a partially overlapping manner.

The generation of the event image can be performed, for example, by setting (a pixel value of) a pixel at the position (x, y) of the event in the frame to white and setting pixels at other positions in the frame to a predetermined color such as gray.

Furthermore, in a case where the polarity of the light amount change as the event is distinguished for the event data, the generation of the frame data may be performed by, for example, setting the pixel to white in a case where a polarity is positive, setting the pixel to black in a case where the polarity is negative, and setting pixels at other positions of the frame to a predetermined color such as gray.

Figure 4:
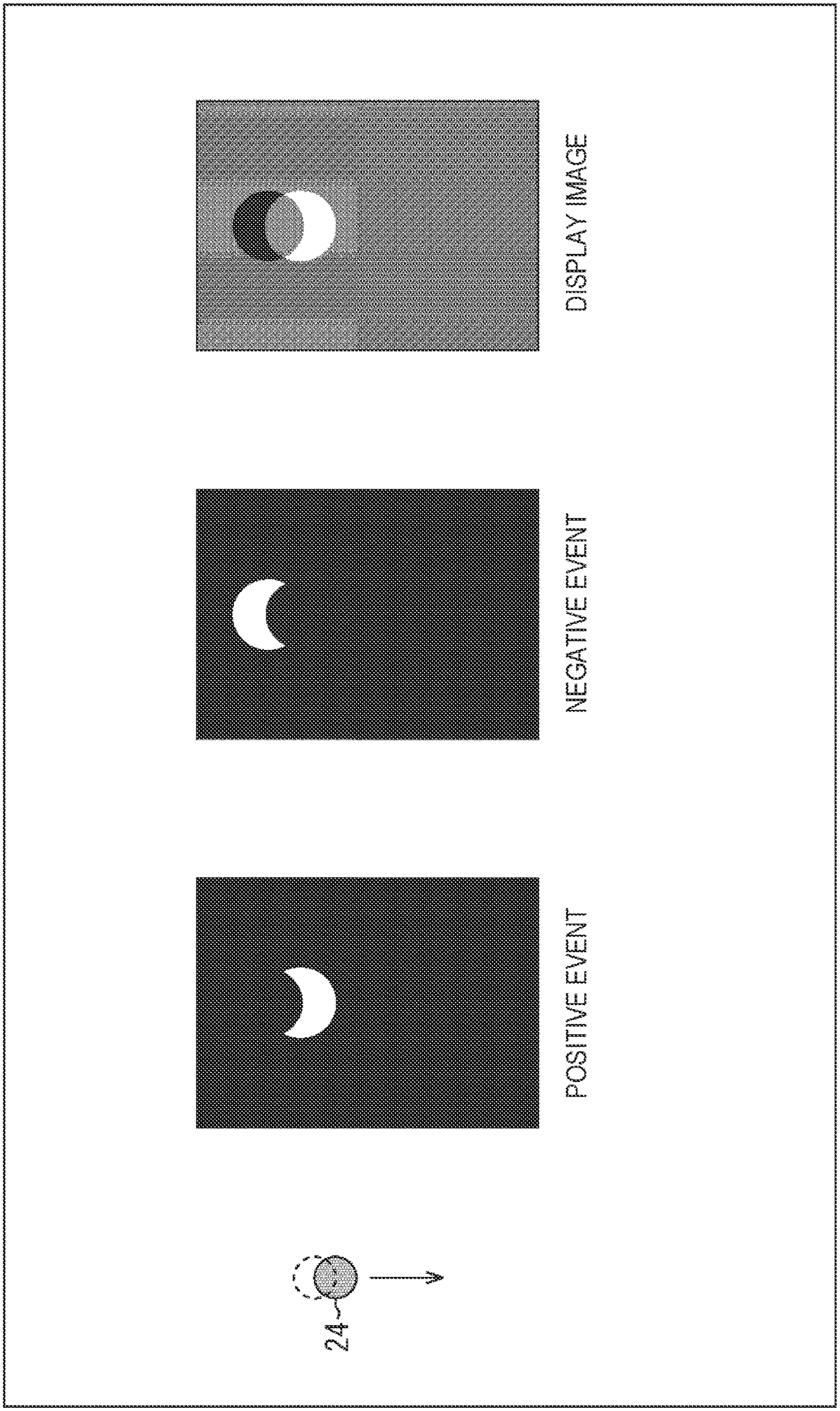
FIG. 4 is a view for explaining an event image capturing a falling spark.

FIG. 4 illustrates an example of an event image in which one falling spark 24 is captured.

The spark 24 has a light amount brighter than the surrounding background. Therefore, in a case where the EVS camera 11 captures falling of one spark 24 from the position indicated by the broken line to the position indicated by the solid line, a brightness change (light amount change) from dark to bright occurs and a positive event occurs in a lower region toward which the spark 24 travels, as illustrated in FIG. 4. On the other hand, in an upper region opposite to the region toward which the spark 24 travels, a brightness change (light amount change) from bright to dark occurs, and a negative event occurs.

When an image in which a pixel having a positive polarity is set to white, a pixel having a negative polarity is set to black, and pixels at other positions of the frame are set to gray is generated as a display image to be displayed on the display 13, an image on the rightmost side in FIG. 4 is obtained.

3. Configuration Example of Information Processing Apparatus

Figure 5:
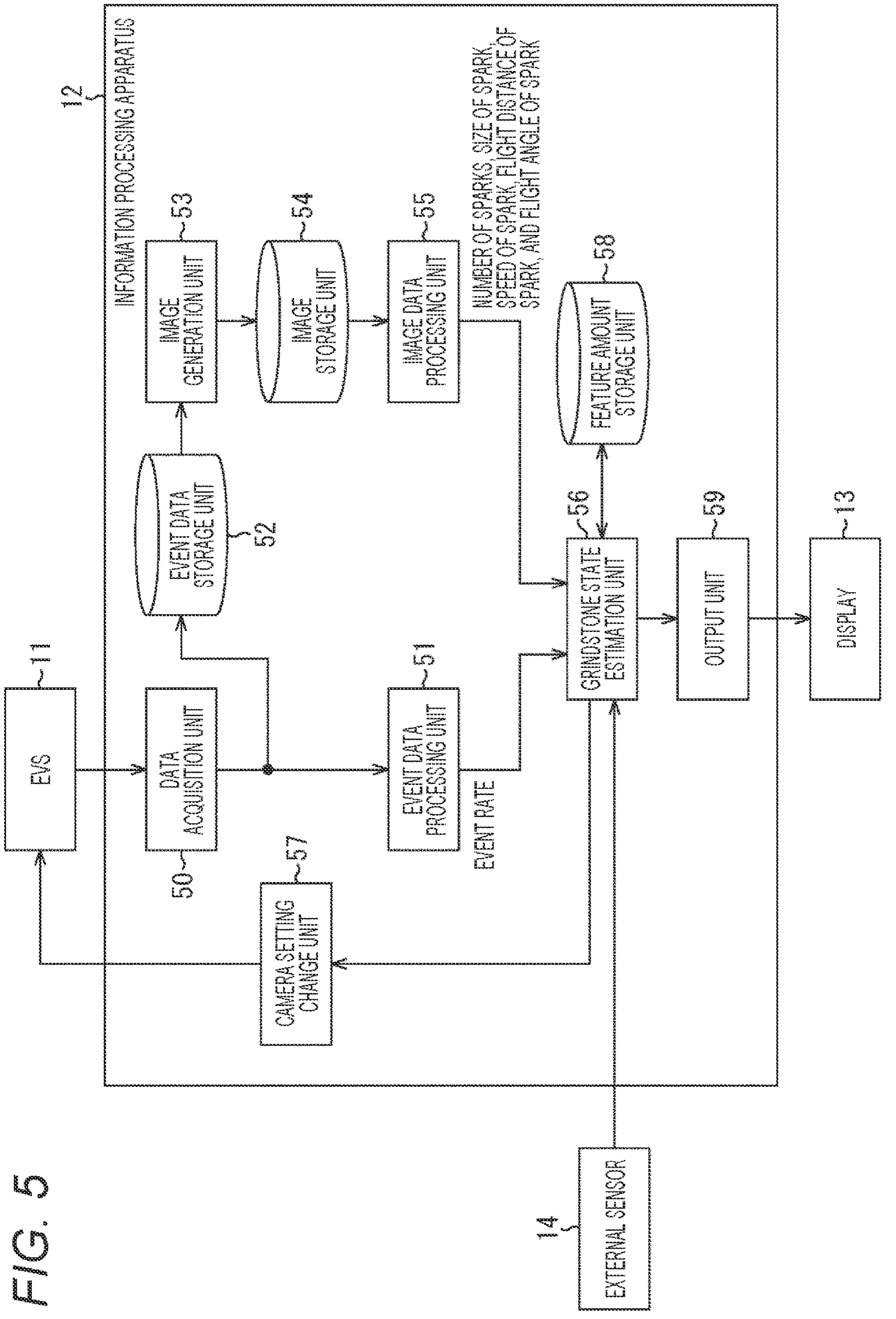
FIG. 5 is a block diagram illustrating a detailed configuration example of an information processing apparatus.

FIG. 5 is a block diagram illustrating a detailed configuration example of the information processing apparatus 12.

Note that, in addition to the EVS camera 11 and the display 13, an optional external sensor 14 is also illustrated in FIG. 5.

The information processing apparatus 12 includes a data acquisition unit 50, an event data processing unit 51, an event data storage unit 52, an image generation unit 53, an image storage unit 54, and an image data processing unit 55. Furthermore, the information processing apparatus 12 includes a grindstone state estimation unit 56, a camera setting change unit 57, a feature amount storage unit 58, and an output unit 59.

The data acquisition unit 50 acquires event data output from the EVS camera 11 at any timing, and supplies the event data to the event data processing unit 51 and the event data storage unit 52.

The event data processing unit 51 executes predetermined event data processing using the event data supplied from the data acquisition unit 50, and supplies the processed data to the grindstone state estimation unit 56. For example, the event data processing unit 51 calculates an event rate which is a frequency of occurrence of the event data and supplies the event rate to the grindstone state estimation unit 56.

The event data storage unit 52 stores therein the event data supplied from the data acquisition unit 50 for a certain period and supplies the event data to the image generation unit 53. The image generation unit 53 generates an event image by using the event data stored in the event data storage unit 52. Specifically, the image generation unit 53 generates an event image by using event data within a predetermined frame width from the beginning of a predetermined frame interval among the event data stored in the event data storage unit 52. The event image generated every predetermined frame interval is supplied to the image storage unit 54. The image storage unit 54 stores therein the event image supplied from the image generation unit 53.

The image data processing unit 55 executes predetermined image data processing using the event image stored in the image storage unit 54. For example, the image data processing unit 55 calculates the number of sparks 24 within the event image, a size of the spark 24, a speed of the spark 24, a flight distance of the spark 24, and a flight angle of the spark 24, and supplies a calculation result to the grindstone state estimation unit 56. The number of sparks 24 is, for example, the number of sparks 24 detected within the event image. The size of the spark 24 is, for example, an outer size (vertical size and horizontal size) of the spark 24 detected within the event image. The speed of the spark 24 is a moving speed calculated from positions of the same spark 24 detected in a plurality of event images. The flight distance of the spark 24 is a distance from a position where the spark 24 is detected first to a position immediately before disappearance of the spark 24. The flight angle of the spark 24 is an angle between a direction starting at the position where the spark 24 is detected first and ending at the position immediately before disappearance of the spark 24 and a vertically downward direction.

The information processing apparatus 12 can detect not only the spark 24 but also the coolant liquid 23 as an event depending on a set value of the event threshold value. In a case where the threshold value is set so that the coolant liquid 23 is also detected as event data, the image data processing unit 55 also calculates the number of droplets of the coolant liquid 23, a size of the droplet of the coolant liquid 23, and a speed of the droplet of the coolant liquid 23 on the basis of the event image and supplies a calculation result to the grindstone state estimation unit 56.

Hereinafter, the number of sparks 24, the size of the spark 24, and the speed of the spark 24 may be referred to as the number of sparks, a spark size, and a spark speed, and the number of droplets of the coolant liquid 23, the size of the droplet of the coolant liquid 23, and the speed of the droplet of the coolant liquid 23 may be referred to as the number of droplets, a droplet size, and a droplet speed so as to be distinguished from each other.

The grindstone state estimation unit 56 estimates the state of the grindstone 22 by using event processed data supplied from the event data processing unit 51 or the image data processing unit 55. Specifically, the grindstone state estimation unit 56 determines whether or not the grindstone 22 is clogged by using at least one feature amount among the event rate, the number of sparks, the spark size, and the spark speed.

For example, the grindstone state estimation unit 56 determines whether or not the spark size is equal to or smaller than a predetermined first state determination threshold value VS1, and determines that the grindstone 22 is clogged in a case where it is determined that the spark size is equal to or smaller than the first state determination threshold value VS1.

Further, for example, the grindstone state estimation unit 56 compares the number of sparks and the spark size with predetermined state determination threshold values. Specifically, the grindstone state estimation unit 56 determines whether or not the number of sparks is equal to or smaller than a first state determination threshold value VS2 and the spark size is equal to or smaller than a second state determination threshold value VS3. In a case where it is determined that the number of sparks is equal to or smaller than the first state determination threshold value VS2 and the spark size is equal to or smaller than the second state determination threshold value VS3, the grindstone state estimation unit 56 determines that the grindstone 22 is clogged.

In a case where it is determined that the grindstone 22 is clogged, the grindstone state estimation unit 56 generates an alert image such as "Clogging has occurred. Maintenance is needed" and outputs the alert image to the display 13 via the output unit 59. Furthermore, in a case where it is determined that the grindstone 22 is in a normal state, the grindstone state estimation unit 56 may generate a display image at a predetermined frame rate and output the display image to the display 13 via the output unit 59.

Moreover, the grindstone state estimation unit 56 also has a function of adjusting the event threshold value of the EVS camera 11 on the basis of the event processed data supplied from the event data processing unit 51 or the image data processing unit 55. For example, the grindstone state estimation unit 56 instructs the camera setting change unit 57 to increase or decrease the event threshold value on the basis of the event rate supplied from the event data processing unit 51. The camera setting change unit 57 changes the event threshold value of the EVS camera 11 on the basis of the instruction to increase or decrease the event threshold value from the grindstone state estimation unit 56.

The feature amount storage unit 58 is a storage unit in which a feature amount acquired from the event data processing unit 51 or the image data processing unit 55 by the grindstone state estimation unit 56 is stored.

The output unit 59 outputs the alert image supplied from the grindstone state estimation unit 56 to the display 13. Furthermore, the output unit 59 may output the event image and the display image to the display 13.

The information processing apparatus 12 is configured as described above, and can estimate the state of the grindstone 22 on the basis of the event data output from the EVS camera 11 and detect, for example, occurrence of clogging of the grindstone 22. The information processing apparatus 12 can prompt an operator to perform maintenance by displaying the alert image on the display 13.

Furthermore, the information processing apparatus 12 can be connected to the external sensor 14 and also estimate the state of the grindstone 22 by using sensor data obtained by the external sensor 14 in addition to the event data output from the EVS camera 11. As the external sensor 14, for example, a microphone that detects sound during grinding, a far infrared sensor that measures temperature, or the like can be adopted. Needless to say, the external sensor 14 may be a sensor other than the microphone and the far infrared sensor.

In a case where the external sensor 14 is connected to the information processing apparatus 12, the sensor data generated by the external sensor 14 is supplied to the grindstone state estimation unit 56. The grindstone state estimation unit 56 estimates the state of the grindstone 22 by using the sensor data supplied from the external sensor 14 and the event processed data supplied from the event data processing unit 51 or the image data processing unit 55.

4. Relationship Between Measurement Parameter and Physical Quantity

Figure 6:
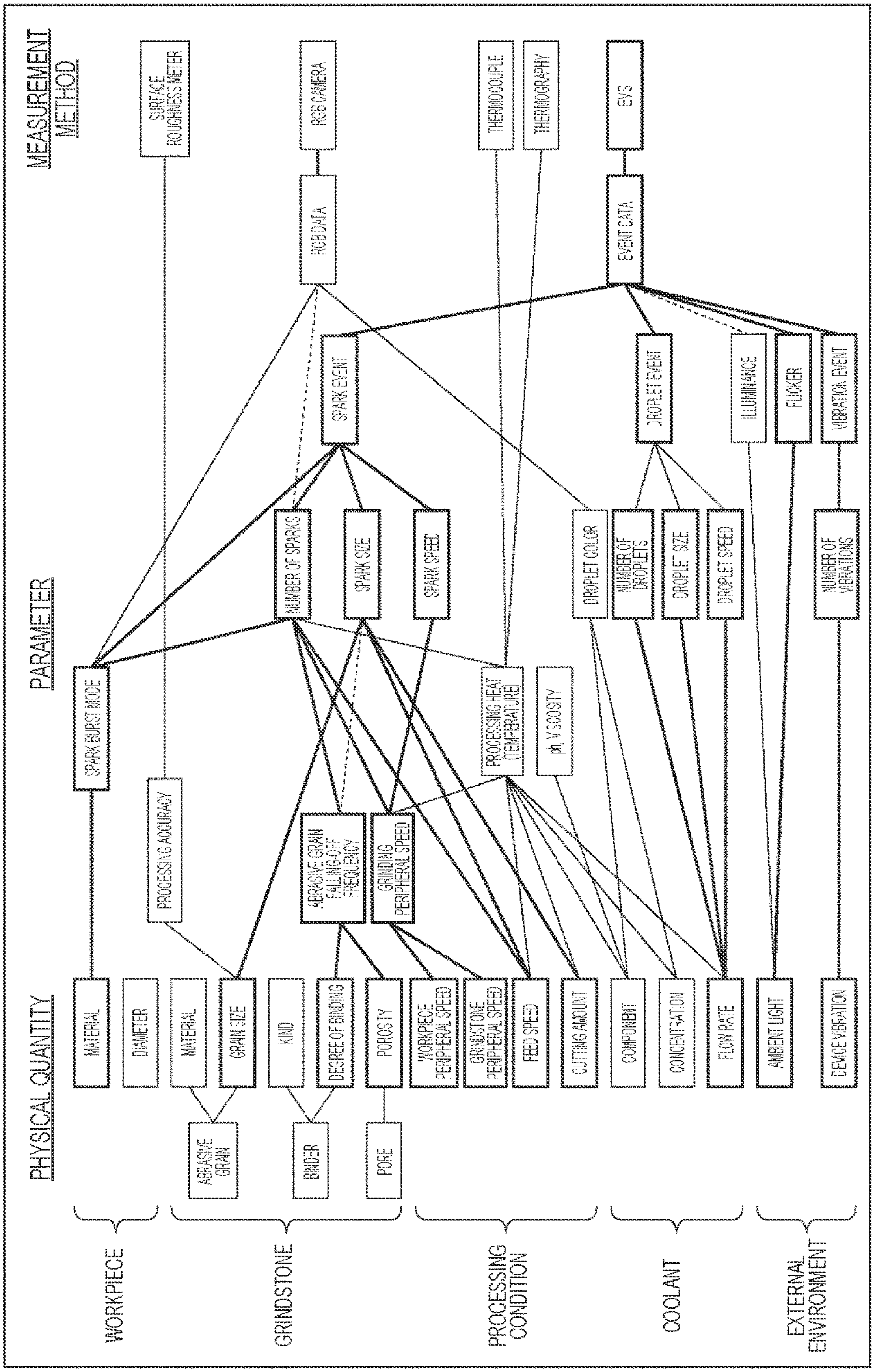
FIG. 6 is a view for explaining a relationship between a measurement parameter and a physical quantity.

FIG. 6 is a diagram illustrating a relationship between a parameter (measurement parameter) measurable by the EVS camera 11 (event sensor) and a physical quantity related to grinding processing of the machine tool 21.

In FIG. 6, items measurable by the EVS camera 11 are surrounded by thick lines.

Examples of a measuring device for determining the necessity of maintenance of the machine tool 21 include a surface roughness meter, an RGB camera, a thermocouple, and thermography described in the rightmost column of FIG. 6. In the present embodiment, the EVS camera 11 (event sensor) is adopted instead of these measuring devices.

The EVS camera 11 can generate and output event data. The event data includes event data of the spark 24 and event data of the coolant liquid 23. An event caused by ambient light or vibration of the device is sometimes detected. Since the event caused by ambient light or vibration of the device corresponds to noise, such an event can be excluded by appropriately setting the event threshold value.

In the event data of the spark 24, the number of sparks, the spark size, the spark speed, and a spark burst mode can be measured as measurement parameters. The spark burst mode is a classification indicating features of burst (a manner of bursting) of the spark 24. The spark burst mode varies depending on the material of the workpiece W. The material of the workpiece W can be specified by detecting the spark burst mode.

The number of sparks is related to an abrasive grain falling-off frequency, a grinding peripheral speed, and a feed speed, which is a processing condition. The spark size is related to a grain size of the abrasive grain of the grindstone 22, and the feed speed and a cutting amount, which are processing conditions. The spark speed is related to the grinding peripheral speed. The abrasive grain falling-off frequency is related to a binding degree of a binder of the grindstone 22 and a porosity of pores, and the grinding peripheral speed is related to a peripheral speed of the workpiece W and a peripheral speed of the grindstone 22, which are processing conditions.

In the event data of the coolant liquid 23, the number of droplets, the droplet size, and the droplet speed can be measured as measurement parameters. The number of droplets, droplet size, and droplet speed are related to a flow rate of the coolant liquid 23.

As for maintenance of the grindstone 22 of the machine tool 21, especially clogging of the grindstone 22 is greatly related to the spark size that can be measured by the event data of the spark 24. The spark size is greatly related to the grain size of the abrasive grain in terms of physical quantity.

FIG. 7 is a table illustrating a correlation between a measurement parameter measurable on the basis of event data and a physical quantity related to the measurement parameter that are indicated by the thick line frame in FIG. 6.

In FIG. 7, a case where there is a positive correlation between a value of a physical quantity illustrated on the left side of the table and a measurement parameter illustrated on the upper side of the table is represented by "+", a case where there is a negative correlation is represented by "−", and a case where there is a correlation other than the positive and negative correlations is represented by the circle.

For example, the grain size of the abrasive grain of the grindstone 22 and the spark size are correlated in a manner such that the spark size becomes larger as the abrasive grain becomes larger. The binding degree of the binder and the number of sparks are correlated in a manner such that the number of sparks increases as the binding degree increases. The porosity of the pores and the number of sparks and the spark size are correlated in a manner such that the number of sparks and the spark size decrease as the porosity increases.

For example, the flow rate of the coolant liquid 23 and the number of droplets and the droplet speed are correlated in a manner such that the number of droplets and the droplet speed also increase as the flow rate increases.

In accordance with the correlation between the measurement parameter measurable in the event data and the physical quantity as illustrated in FIG. 7, the grindstone state estimation unit 56 can estimate a physical quantity from a data processing result of the event data and determine a maintenance timing.

5. Flowchart of Maintenance Timing Determination Processing

Figure 8:
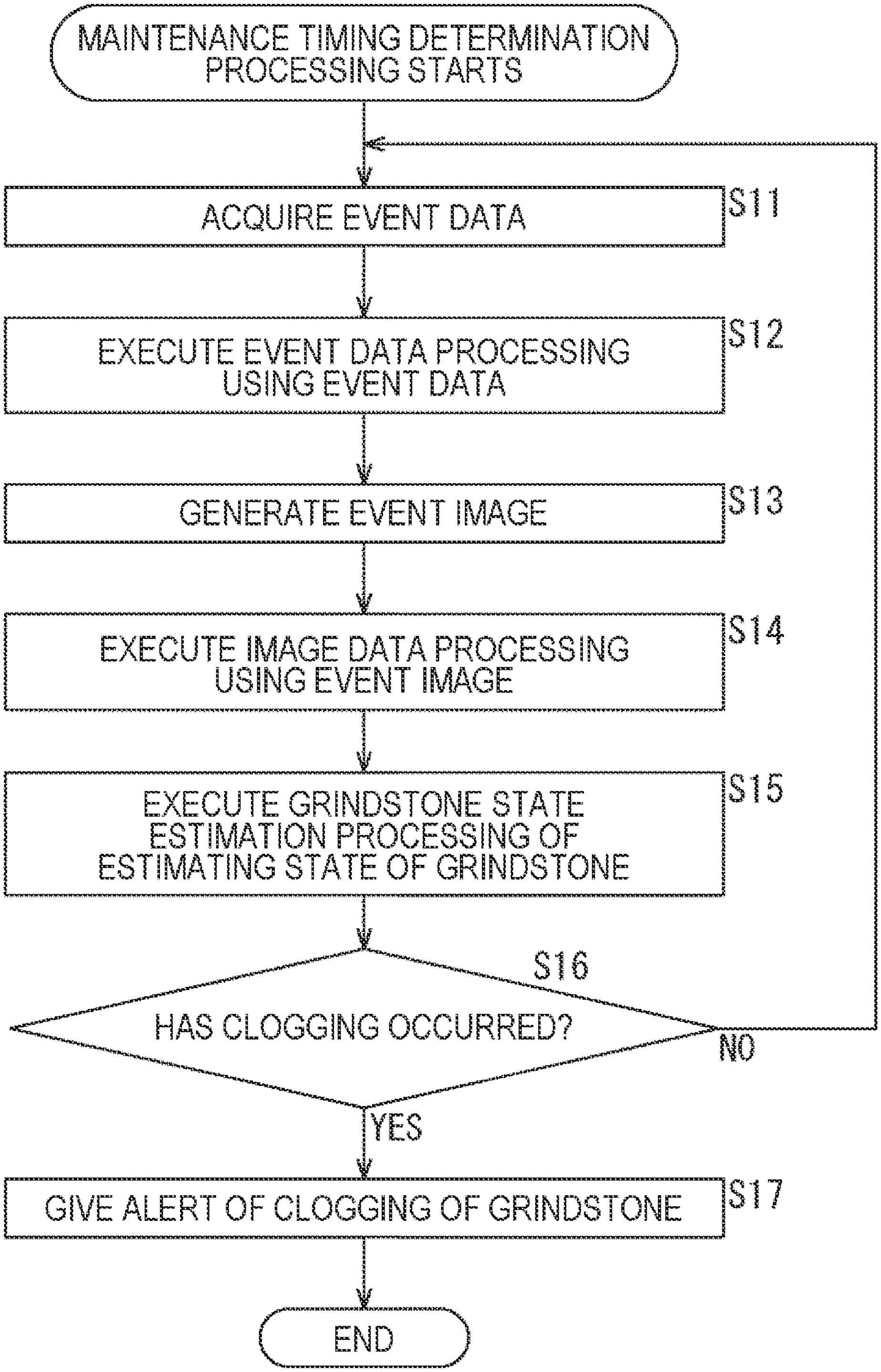
FIG. 8 is a flowchart for explaining maintenance timing determination processing performed by the information processing system.

Next, maintenance timing determination processing performed by the information processing system 1 will be described with reference to the flowchart of FIG. 8. This processing starts, for example, when the EVS camera 11 and the information processing apparatus 12 are activated (powered on).

First, in step S11, the data acquisition unit 50 acquires event data output from the EVS camera 11 at any timing, and supplies the event data to the event data processing unit 51 and the event data storage unit 52.

In step S12, the event data processing unit 51 executes predetermined event data processing using the event data supplied from the data acquisition unit 50, and supplies the processed data to the grindstone state estimation unit 56. For example, the event data processing unit 51 calculates an event rate which is a frequency of occurrence of the event data and supplies the event rate to the grindstone state estimation unit 56.

In step S13, the event data storage unit 52 stores therein the event data supplied from the data acquisition unit 50 for a certain period and supplies the event data to the image generation unit 53. The image generation unit 53 generates an event image by using the event data stored in the event data storage unit 52 and supplies the event image to the image storage unit 54.

In step S14, the image data processing unit 55 executes predetermined image data processing using the event image stored in the image storage unit 54. For example, the image data processing unit 55 calculates the number of sparks 24 within the event image, a size of the spark 24, a speed of the spark 24, a flight distance of the spark 24, and a flight angle of the spark 24, and supplies a calculation result to the grindstone state estimation unit 56.

In step S15, the grindstone state estimation unit 56 executes grindstone state estimation processing of estimating the state of the grindstone 22 by using event processed data supplied from the event data processing unit 51 or the image data processing unit 55. For example, as the grindstone state estimation processing, the grindstone state estimation unit 56 determines whether or not the spark size is equal to or smaller than the first state determination threshold value VS1. Alternatively, as the grindstone state estimation processing, the grindstone state estimation unit 56 determines whether or not the number of sparks is equal to or smaller than the first state determination threshold value VS2 and the spark size is equal to or smaller than the second state determination threshold value VS3.

In step S16, the grindstone state estimation unit 56 determines whether or not the grindstone 22 is clogged on the basis of a result of the grindstone state estimation processing.

In a case where it is determined in step S16 that the grindstone 22 is not clogged, the processing returns to step S11, and the processes in steps S11 to S16 described above are executed again. Note that in a case where the grindstone 22 is in a normal state, that is, not clogged, a display image generated on the basis of the event data, the event image generated by the image generation unit 53, or the like may be supplied to the display 13 via the output unit 59 and displayed.

On the other hand, in a case where it is determined in step S16 that the grindstone 22 is clogged, the processing proceeds to step S17, and the grindstone state estimation unit 56 gives an alert of the clogging of the grindstone 22. For example, the grindstone state estimation unit 56 generates an alert image such as "Clogging has occurred. Maintenance is needed" and outputs the alert image to the display 13 via the output unit 59. The display 13 displays the alert image supplied from the information processing apparatus 12.

The maintenance timing determination processing by the information processing system 1 is executed as described above. By the above processing, an operator who has confirmed the alert image displayed on the display 13 grasps that a maintenance timing has come and performs, for example, dressing of the grindstone 22.

<Grindstone State Estimation Processing Using Learning Model>

In the grindstone state estimation processing described above, at least one of the number of sparks 24, the size of the spark 24, the speed of the spark 24, the flight distance of the spark 24, the flight angle of the spark 24, the number of droplets of the coolant liquid 23, the size of the droplet of the coolant liquid 23, or the speed of the droplet of the coolant liquid 23 is used as a feature amount, and the state of the grindstone 22 is estimated by the threshold value determination process of comparing the feature amount with a predetermined threshold value determined in advance.

Alternatively, as the grindstone state estimation processing of estimating the state of the grindstone 22, the state of the grindstone 22 may be estimated and a maintenance timing may be determined by using a learning model generated by performing machine learning. For example, the grindstone state estimation unit 56 generates a learning model by machine learning using necessity of maintenance as training data by using event data obtained during grinding using the grindstone 22 that is, for example, clogged and needs maintenance and event data obtained during grinding using the grindstone 22 that is in a normal state (state that does not need maintenance). The grindstone state estimation unit 56 estimates necessity of maintenance of the grindstone 22 on the basis of input event data by using the generated learning model. Alternatively, feature amounts such as the number of sparks 24, the size of the spark 24, the speed of the spark 24, the flight distance of the spark 24, and the flight angle of the spark 24 may be used as the training data for generation of the learning model instead of the event data itself. The learning model may be trained so as to be able to determine not only the necessity of maintenance but also the state of the grindstone 22 such as clogging, dulling, or shedding.

<Grindstone State Estimation Processing Using External Sensor Data>

Furthermore, in a case where the external sensor 14 is connected to the information processing apparatus 12, the state of the grindstone 22 may be estimated by using the sensor data obtained by the external sensor 14 in addition to the data processing result of the event data. The grindstone state estimation processing using the data processing result of the event data and the sensor data may be threshold value determination processing or may be determination processing using a learning model.

6. Flowchart of Threshold Value Update Processing

Figure 9:
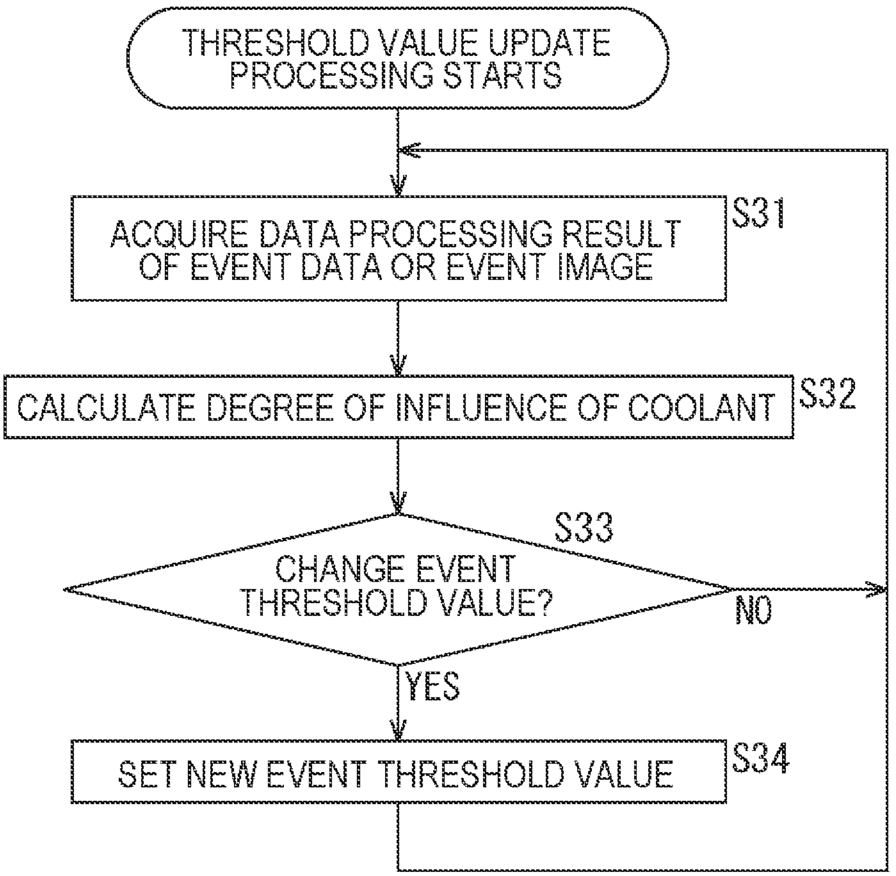
FIG. 9 is a flowchart for explaining threshold value update processing.

Next, threshold value update processing for dynamically changing the event threshold value will be described with reference to the flowchart of FIG. 9. This processing, for example, starts together with the maintenance timing determination processing described with reference to FIG. 8 and is executed in parallel with the maintenance timing determination processing.

First, in step S31, the grindstone state estimation unit 56 acquires a data processing result of event data or an event image. The process in step S31 is included in the maintenance timing determination processing of FIG. 8 executed in parallel, and therefore can be substantially omitted. Furthermore, the grindstone state estimation unit 56 may also acquire the event data itself output from the EVS camera 11 via the event data processing unit 51.

In step S32, the grindstone state estimation unit 56 calculates a degree of influence of the coolant liquid 23 by using the acquired data processing result. For example, in a case where an event rate supplied from the event data processing unit 51 is used, the grindstone state estimation unit 56 can calculate the degree of influence of the coolant liquid 23 from the event rate in a state where no spark 24 is emitted. Furthermore, for example, in a case where the data processing result of the event image is used, the grindstone state estimation unit 56 can calculate the degree of influence of the coolant liquid 23 on the basis of a ratio of the number of sparks and the number of droplets. The spark 24 and the coolant liquid 23 can be distinguished, for example, by sizes.

In step S33, the grindstone state estimation unit 56 determines whether or not to change the event threshold value. For example, the grindstone state estimation unit 56 determines to change the event threshold value in a case where it is desired to detect only the spark 24 from a state in which both the spark 24 and the coolant liquid 23 are currently detected as events. In this case, the event threshold value is adjusted to a value larger than the current value. Alternatively, it is determined that the event threshold value is changed in a case where it is desired to detect both the spark 24 and the coolant liquid 23 from a state where only the spark 24 is currently detected. In this case, the event threshold value is adjusted to a value smaller than the current value.

In a case where it is determined in step S33 that the event threshold value is not changed, the processing returns to step S31, and the processes steps S31 to S33 described above are executed again.

On the other hand, in a case where it is determined in step S33 that the event threshold value is changed, the processing proceeds to step S34, and the grindstone state estimation unit 56 instructs the camera setting change unit 57 to increase or decrease the event threshold value. The camera setting change unit 57 sets a new event threshold value by supplying the new event threshold value to the EVS camera 11. The new event threshold value is, for example, a value obtained by changing the event threshold value by a predetermined change width in the instructed increasing or decreasing direction.

According to the threshold value update processing described above, the event threshold value can be adjusted on the basis of an event detection status in parallel with the grindstone state estimation processing. Whether to detect both the spark 24 and the coolant liquid 23 as an event or to detect only the spark 24 as an event can be specified in the information processing apparatus 12 in advance, for example, by setting an operation mode.

7. Second Embodiment of Information Processing System

Next, a second embodiment to which the present technology is applied is described.

In the first embodiment of the information processing system illustrated in FIG. 1, the EVS camera 11 detects a change in luminance of the spark 24 or the like as an event and outputs event data to the information processing apparatus 12, and the information processing apparatus 12 executes processing of estimating the state of the grindstone 22 by using the event data.

On the other hand, in an information processing system 1 of the second embodiment described below, processing of estimating a state of a grindstone 22 by using event data is also performed in an EVS camera. In other words, the EVS camera 11 and the information processing apparatus 12 in the first embodiment are replaced with one EVS camera 300 illustrated in FIG. 10.

<Configuration Example of EVS Camera>

Figure 10:
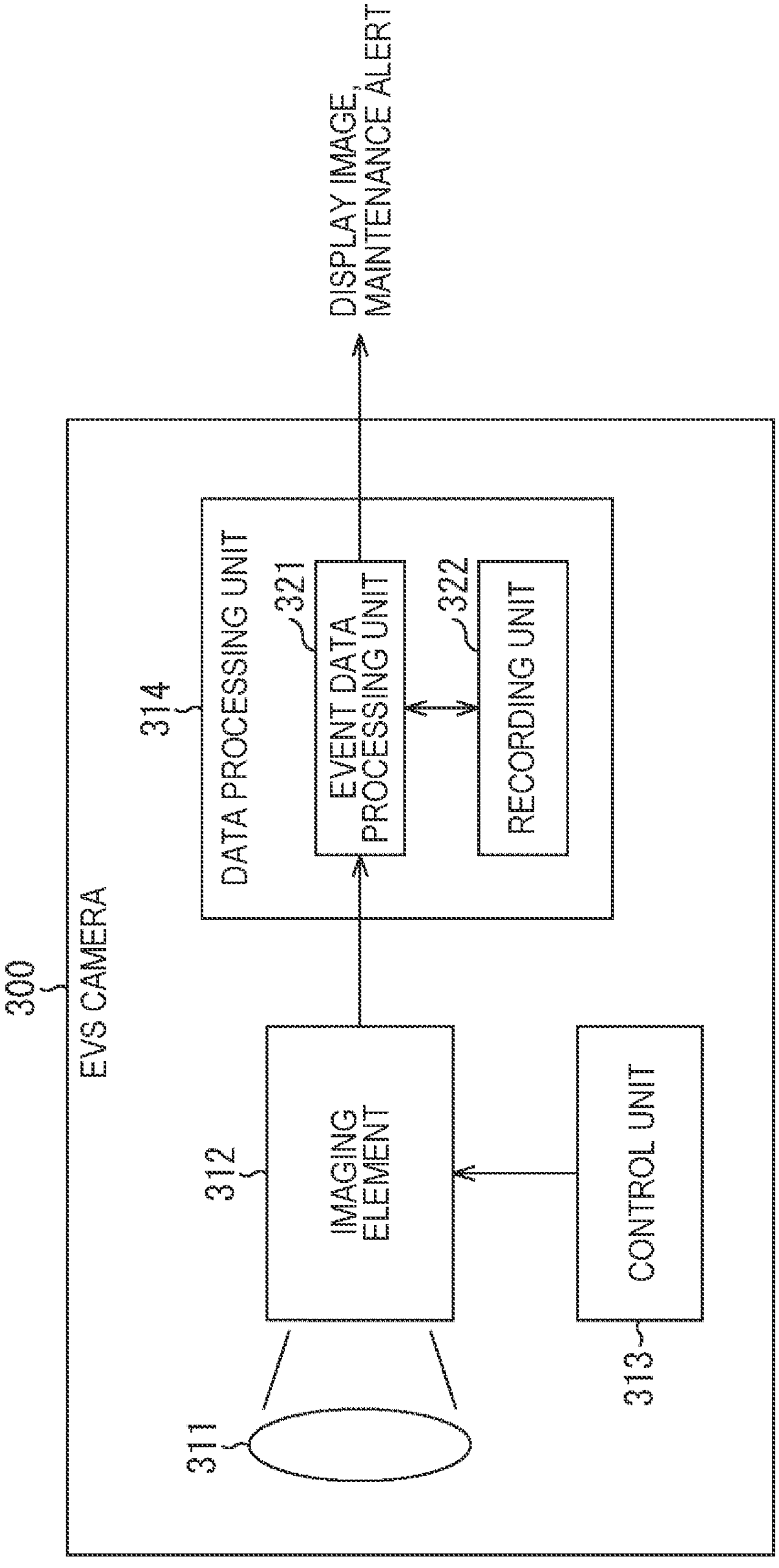
FIG. 10 is a block diagram illustrating a configuration example of an EVS camera of a second embodiment of an information processing system to which the present technology is applied.

The EVS camera 300 illustrated in FIG. 10 is an imaging device including an event sensor and a processing unit that executes the function of the information processing apparatus 12 of the first embodiment. The EVS camera 300 is installed at the same position as the EVS camera 11 in FIG. 1, detects a change in luminance of a spark 24 or a coolant liquid 23 as an event, and generates event data. Furthermore, the EVS camera 300 executes grindstone state estimation processing of estimating the state of the grindstone 22 on the basis of the event data, and outputs a maintenance alert on the basis of a result of the grindstone state estimation processing. For example, in a case where it is determined that maintenance is needed, the EVS camera 300 causes a display 13 to display an alert image such as "Clogging has occurred. Maintenance is needed." Moreover, the EVS camera 300 can generate a display image to be monitored by an operator on the basis of the event data, and cause the display 13 to display the display image.

The EVS camera 300 includes an optical unit 311, an imaging element 312, a control unit 313, and a data processing unit 314.

The optical unit 311 collects light from a subject and causes the light to enter the imaging element 312. The imaging element 312 photoelectrically converts incident light incident via the optical unit 311 to generate event data, and supplies the event data to the data processing unit 314. The imaging element 312 is a light receiving element that outputs event data indicating an occurrence of an event with a luminance change in a pixel as the event.

The control unit 313 controls the imaging element 312. For example, the control unit 313 instructs the imaging element 312 to start and end imaging.

The data processing unit 314 includes, for example, a field programmable gate array (FPGA), a digital signal processor (DSP), a microprocessor, or the like, and executes processing performed by the information processing apparatus 12 in the first embodiment. The data processing unit 314 includes an event data processing unit 321 and a recording unit 322. For example, the event data processing unit 321 performs event data processing using event data supplied from the imaging element 312, image data processing using an event image, grindstone state estimation processing of estimating the state of the grindstone 22, and the like. The recording unit 322 corresponds to the event data storage unit 52, the image storage unit 54, and the feature amount storage unit 58 in the first embodiment, and records and accumulates predetermined data in a predetermined recording medium as necessary.

<Configuration Example of Imaging Element>

Figure 11:
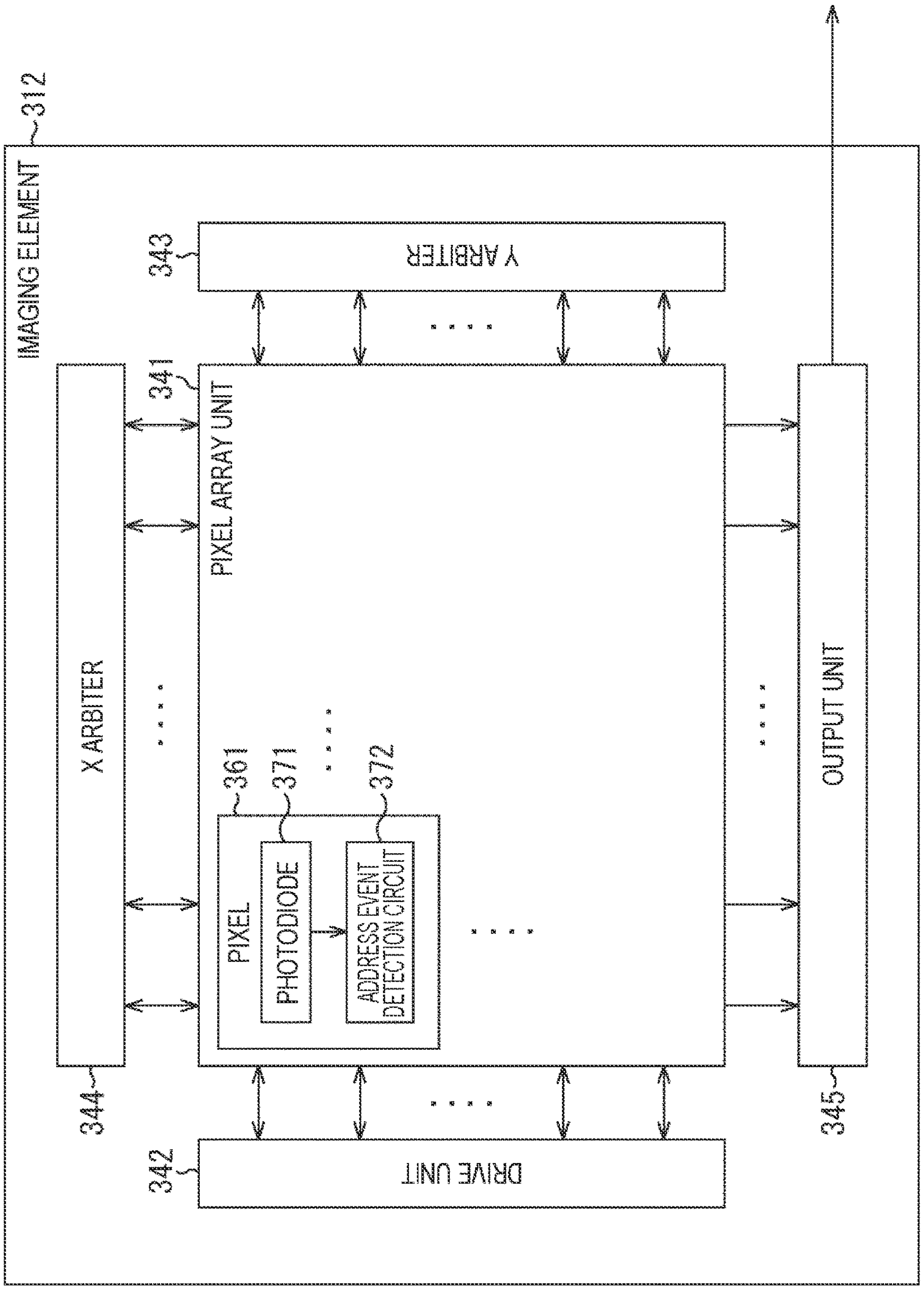
FIG. 11 is a block diagram illustrating a detailed configuration example of an imaging element.

FIG. 11 is a block diagram illustrating a schematic configuration example of the imaging element 312.

The imaging element 312 includes a pixel array unit 341, a drive unit 342, a Y arbiter 343, an X arbiter 344, and an output unit 345.

In the pixel array unit 341, a plurality of pixels 361 is arranged in a two-dimensional lattice manner. Each pixel 361 includes a photodiode 371 as a photoelectric conversion element and an address event detection circuit 372. In a case where a change exceeding a predetermined threshold value occurs in a photocurrent as an electrical signal generated by photoelectric conversion of the photodiode 371, the address event detection circuit 372 detects the change in the photocurrent as an event. In a case where an event is detected, the address event detection circuit 372 outputs a request requesting output of event data indicating occurrence of the event to the Y arbiter 343 and the X arbiter 344.

The drive unit 342 drives the pixel array unit 341 by supplying a control signal to each pixel 361 of the pixel array unit 341.

The Y arbiter 343 arbitrates requests from the pixels 361 in the same row in the pixel array unit 341, and returns a response indicating permission or non-permission of output of event data to the pixel 361 that has transmitted the request. The X arbiter 344 arbitrates requests from the pixels 361 in the same column in the pixel array unit 341, and returns a response indicating permission or non-permission of output of event data to the pixel 361 that has transmitted the request. A pixel 361 to which a permission response has been returned from both the Y arbiter 343 and the X arbiter 344 can output event data to the output unit 345.

Note that the imaging element 312 may include only one of the Y arbiter 343 and the X arbiter 344. For example, in a case where only the X arbiter 344 is included, data of all the pixels 361 in the same column including the pixel 361 that has transmitted the request is transferred to the output unit 345. Then, in the output unit 345 or the data processing unit 314 (FIG. 10) in the subsequent stage, only event data of a pixel 361 where an event has actually occurred is selected. In a case where only the Y arbiter 343 is included, pixel data is transferred to the output unit 345 in units of rows, and only event data of a necessary pixel 361 is selected in the subsequent stage.

The output unit 345 performs necessary processing on the event data output from each pixel 361 constituting the pixel array unit 341, and supplies the processed event data to the data processing unit 314 (FIG. 10).

<Configuration Example of Address Event Detection Circuit>

Figure 12:
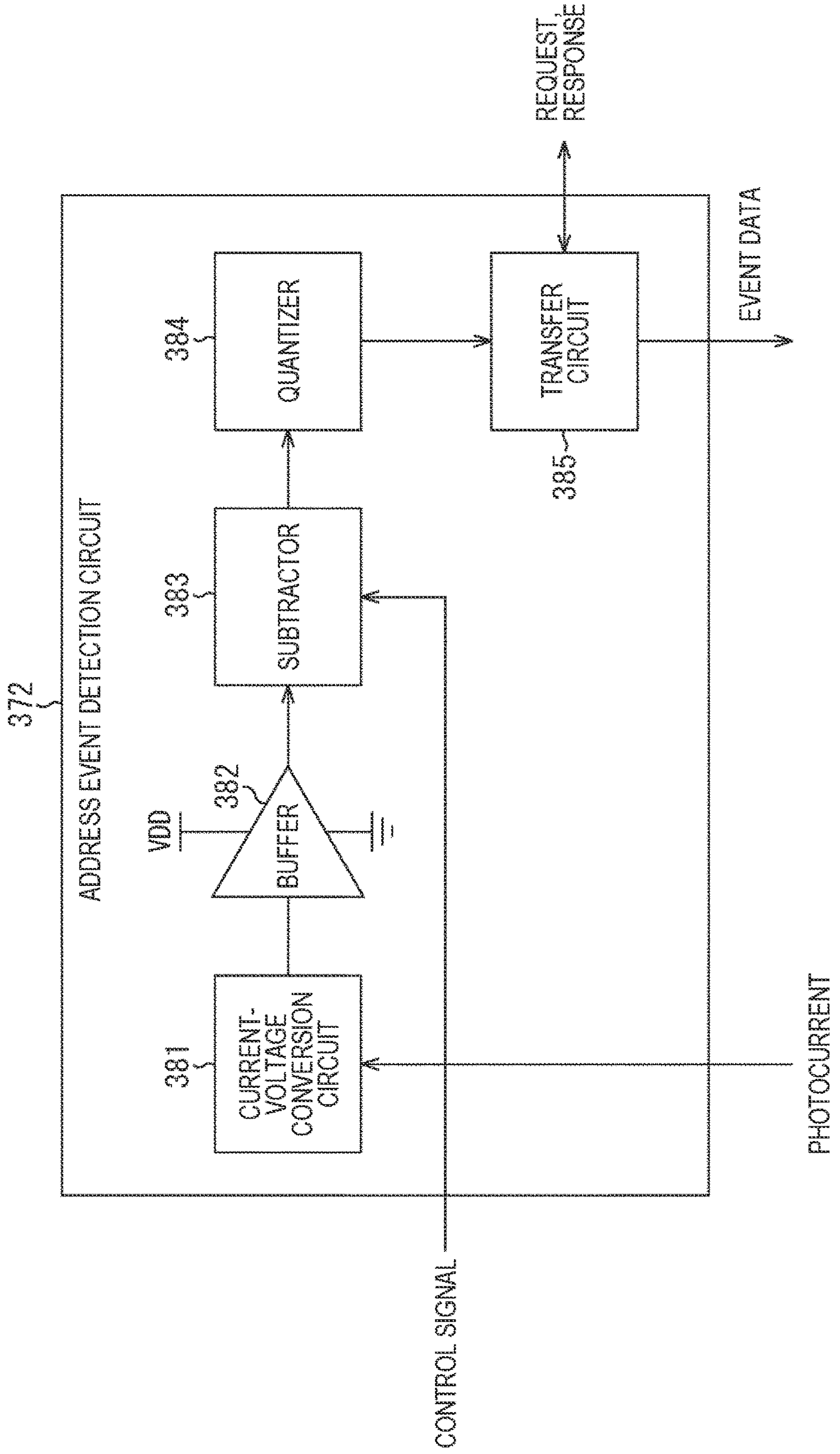
FIG. 12 is a block diagram illustrating a configuration example of an address event detection circuit.

FIG. 12 is a block diagram illustrating a configuration example of the address event detection circuit 372.

The address event detection circuit 372 includes a current-voltage conversion circuit 381, a buffer 382, a subtractor 383, a quantizer 384, and a transfer circuit 385.

The current-voltage conversion circuit 381 converts a photocurrent from the corresponding photodiode 371 into a voltage signal. The current-voltage conversion circuit 381 generates a voltage signal corresponding to a logarithmic value of the photocurrent, and outputs the voltage signal to the buffer 382.

The buffer 382 buffers the voltage signal from the current-voltage conversion circuit 381, and outputs the voltage signal to the subtractor 383. This buffer 382 makes it possible to secure isolation of noise accompanying a switching operation in a subsequent stage, and to improve a driving force for driving the subsequent stage. Note that the buffer 382 can be omitted.

The subtractor 383 lowers a level of the voltage signal from the buffer 382, in accordance with a control signal from the drive unit 342. The subtractor 383 outputs the lowered voltage signal to the quantizer 384.

The quantizer 384 quantizes the voltage signal from the subtractor 383 into a digital signal, and supplies the digital signal to the transfer circuit 385 as event data. The transfer circuit 385 transfers (outputs) the event data to the output unit 345. That is, the transfer circuit 385 supplies a request requesting output of the event data to the Y arbiter 343 and the X arbiter 344. Then, in a case where a response indicating that output of the event data is permitted is received from the Y arbiter 343 and the X arbiter 344 in response to the request, the transfer circuit 385 transfers the event data to the output unit 345.

<Detailed Configuration Example of Address Event Detection Circuit>

Figure 13:
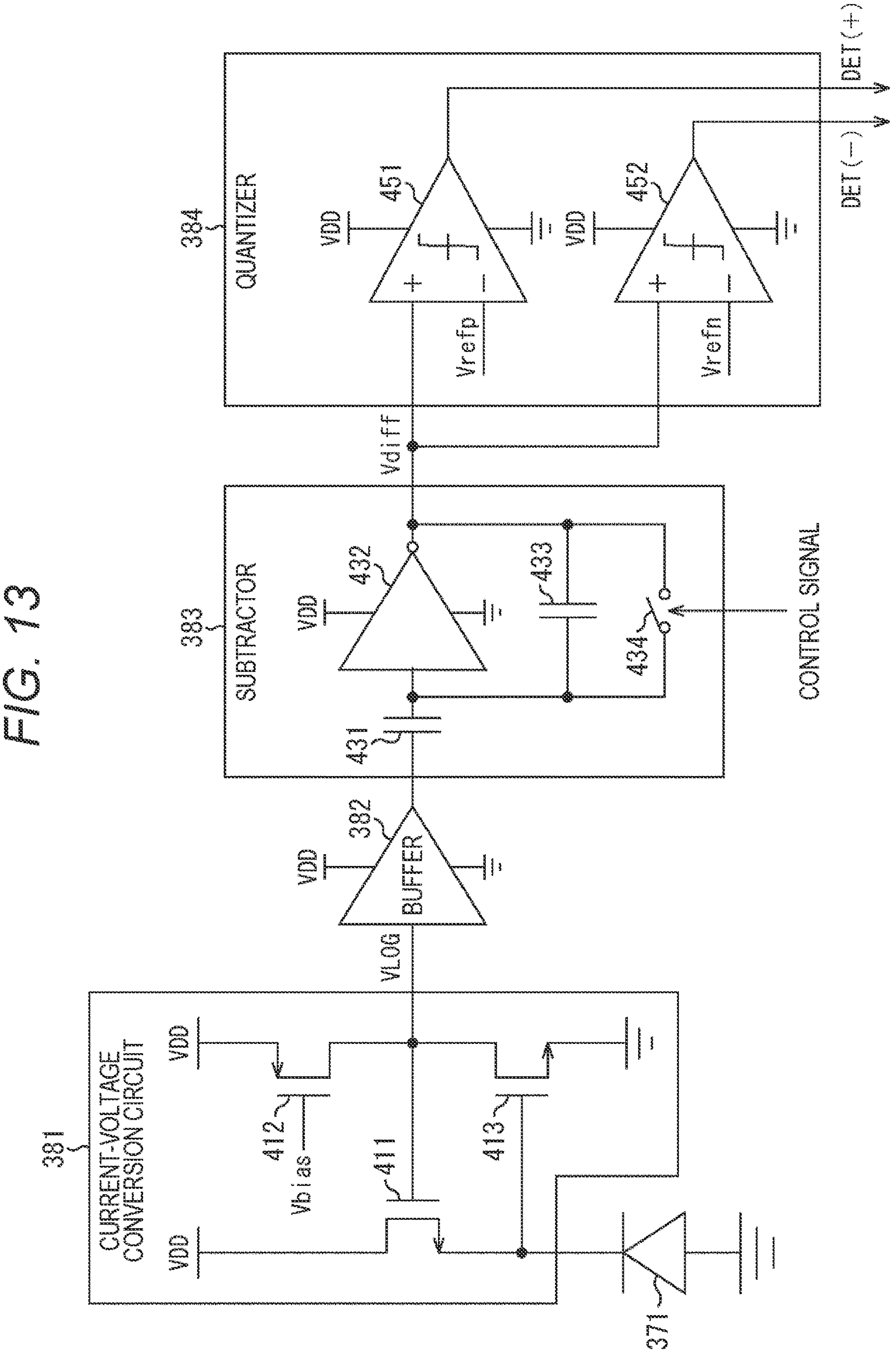
FIG. 13 is a circuit illustrating a detailed configuration of a current-voltage conversion circuit, a subtractor, and a quantizer.

FIG. 13 is a circuit illustrating a detailed configuration of the current-voltage conversion circuit 381, the subtractor 383, and the quantizer 384. In FIG. 13, the photodiode 371 connected to the current-voltage conversion circuit 381 is also illustrated.

The current-voltage conversion circuit 381 includes FETs 411 to 413. As the FETs 411 and 413, for example, an N-type metal oxide semiconductor (NMOS) FET can be adopted, and as the FET 412, for example, a P-type metal oxide semiconductor (PMOS) FET can be adopted.

The photodiode 371 receives incident light, performs photoelectric conversion, and generates and allows flowing of a photocurrent as an electrical signal. The current-voltage conversion circuit 381 converts the photocurrent from the photodiode 371 into a voltage (hereinafter, also referred to as a photovoltage) VLOG corresponding to a logarithm of the photocurrent, and outputs the voltage VLOG to the buffer 382.

A source of the FET 411 is connected to a gate of the FET 413, and a photocurrent from the photodiode 371 flows through a connection point between the source of the FET 411 and the gate of the FET 413. A drain of the FET 411 is connected to a power supply VDD, and a gate thereof is connected to a drain of the FET 413.

A source of the FET 412 is connected to the power supply VDD, and a drain thereof is connected to a connection point between the gate of the FET 411 and the drain of the FET 413. A predetermined bias voltage Vbias is applied to a gate of the FET 412. A source of the FET 413 is grounded.

The drain of the FET 411 is connected to the power supply VDD side, and is a source follower. The photodiode 371 is connected to the source of the FET 411 that is a source follower, and this connection allows flowing of a photocurrent due to an electric charge generated by photoelectric conversion of the photodiode 371, through (the drain to the source of) the FET 411. The FET 411 operates in a subthreshold value region, and the photovoltage VLOG corresponding to a logarithm of the photocurrent flowing through the FET 411 appears at the gate of the FET 411. As described above, in the photodiode 371, the photocurrent from the photodiode 371 is converted into the photovoltage VLOG corresponding to the logarithm of the photocurrent by the FET 411.

The photovoltage VLOG is outputted from the connection point between the gate of the FET 411 and the drain of the FET 413 to the subtractor 383 via the buffer 382.

For the photovoltage VLOG from the current-voltage conversion circuit 381, the subtractor 383 computes a difference between a photovoltage at the present time and a photovoltage at a timing different from the present time by a minute time, and outputs a difference signal Vdiff corresponding to the difference.

The subtractor 383 includes a capacitor 431, an operational amplifier 432, a capacitor 433, and a switch 434. The quantizer 384 includes comparators 451 and 452.

One end of the capacitor 431 is connected to an output of the buffer 382, and another end is connected to an input terminal of the operational amplifier 432. Therefore, the photovoltage VLOG is inputted to the (inverting) input terminal of the operational amplifier 432 via the capacitor 431.

An output terminal of the operational amplifier 432 is connected to non-inverting input terminals (+) of the comparators 451 and 452 of the quantizer 384.

One end of the capacitor 433 is connected to the input terminal of the operational amplifier 432, and another end is connected to the output terminal of the operational amplifier 432.

The switch 434 is connected to the capacitor 433 so as to turn on/off connection between both ends of the capacitor 433. The switch 434 turns on/off the connection between both ends of the capacitor 433 by turning on/off in accordance with a control signal of the drive unit 342.

The capacitor 433 and the switch 434 constitute a switched capacitor. When the switch 434 having been turned off is temporarily turned on and turned off again, the capacitor 433 is reset to a state in which electric charges are discharged and electric charges can be newly accumulated.

The photovoltage VLOG of the capacitor 431 on the photodiode 371 side when the switch 434 is turned on is denoted by Vinit, and a capacitance (an electrostatic capacitance) of the capacitor 431 is denoted by C1. The input terminal of the operational amplifier 432 is virtually grounded, and an electric charge Qinit accumulated in the capacitor 431 in a case where the switch 434 is turned on is expressed by Formula (1).

$$\text{Qinit}=C1\times\text{Vinit} \quad (1)$$

Furthermore, in a case where the switch 434 is on, both ends of the capacitor 433 are short-circuited, so that the electric charge accumulated in the capacitor 433 becomes 0.

Thereafter, when the photovoltage VLOG of the capacitor 431 on the photodiode 371 side in a case where the switch 434 is turned off is represented as Vafter, an electric charge Qafter accumulated in the capacitor 431 when the switch 434 is turned off is represented by Formula (2).

$$\text{Qafter}=C1\times\text{Vafter} \quad (2)$$

When the capacitance of the capacitor 433 is represented as C2, then an electric charge Q2 accumulated in the capacitor 433 is represented by Formula (3) by using the difference signal Vdiff which is an output voltage of the operational amplifier 432.

$$Q2=-C2\times\text{Vdiff} \quad (3)$$

Before and after the switch 434 is turned off, a total electric charge amount of the electric charge of the capacitor 431 and the electric charge of the capacitor 433 does not change, so that Formula (4) is established.

$$\text{Qinit}=\text{Qafter}+Q2 \quad (4)$$

When Formulas (1) to (3) are substituted into Formula (4), Formula (5) is obtained.

$$\text{Vdiff}=-(C1/C2)\times(\text{Vafter}-\text{Vinit}) \quad (5)$$

According to Formula (5), the subtractor 383 subtracts the photovoltages Vafter and Vinit, that is, calculates the difference signal Vdiff corresponding to a difference (Vafter−Vinit) between the photovoltages Vafter and Vinit. According to Formula (5), a gain of subtraction by the subtractor 383 is C1/C2. Therefore, the subtractor 383 outputs, as the difference signal Vdiff, a voltage obtained by multiplying a change in the photovoltage VLOG after resetting of the capacitor 433 by C1/C2.

The subtractor 383 outputs the difference signal Vdiff by turning on and off the switch 434 with a control signal outputted from the drive unit 342.

The difference signal Vdiff output from the subtractor 383 is supplied to the non-inverting input terminals (+) of the comparators 451 and 452 of the quantizer 384.

The comparator 451 compares the difference signal Vdiff from the subtractor 383 with a positive-side threshold value Vrefp input to an inverting input terminal (−). The comparator 451 outputs a detection signal DET(+) of a high (H) level or a low (L) level indicating whether or not the difference signal Vdiff has exceeded the positive-side threshold value Vrefp to the transfer circuit 385 as a quantized value of the difference signal Vdiff.

The comparator 452 compares the difference signal Vdiff from the subtractor 383 with a negative-side threshold value Vrefn input to an inverting input terminal (−). The comparator 452 outputs a detection signal DET(−) of a high (H) level or a low (L) level indicating whether or not the difference signal Vdiff has exceeded the negative-side threshold value Vrefn to the transfer circuit 385 as a quantized value of the difference signal Vdiff.

Figure 14:
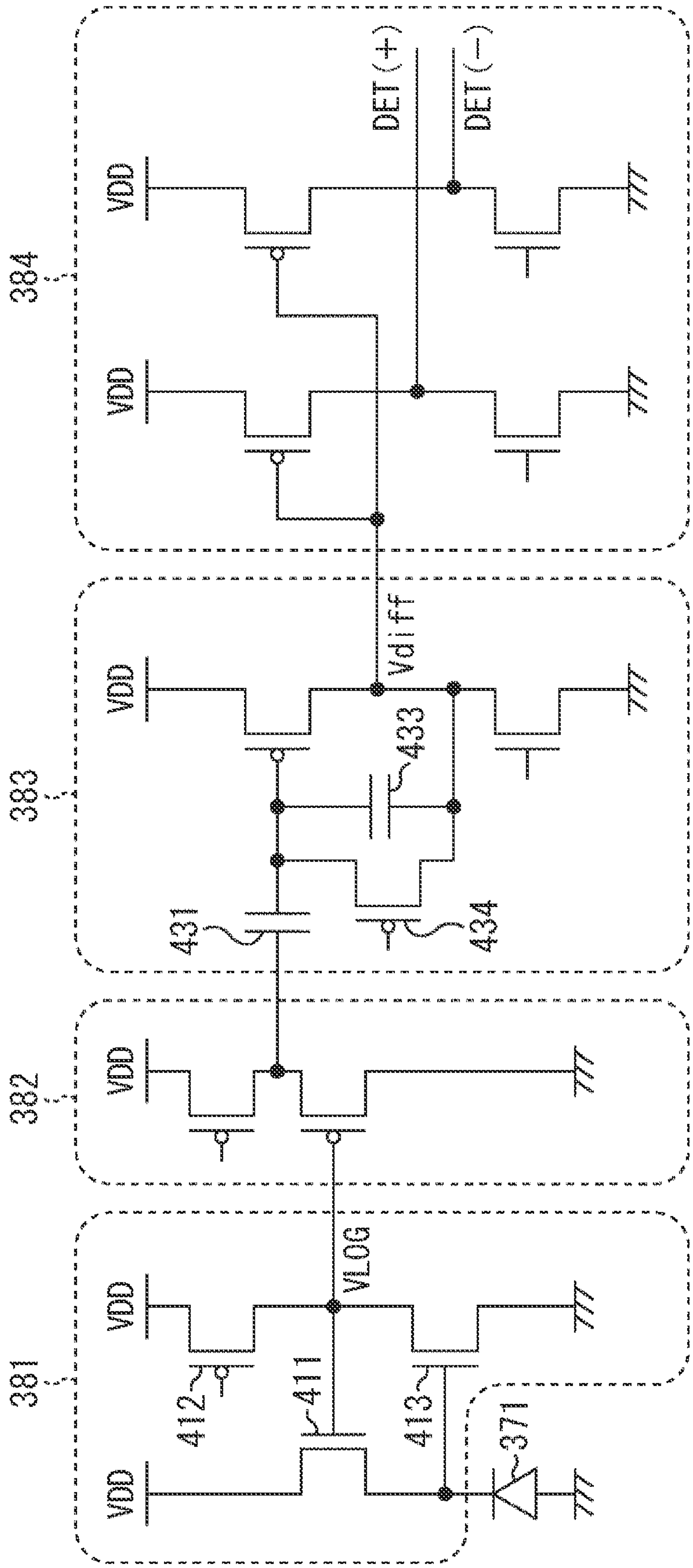
FIG. 14 is a diagram illustrating a more detailed configuration example of the address event detection circuit.

FIG. 14 illustrates a more detailed circuit configuration example of the current-voltage conversion circuit 381, the buffer 382, the subtractor 383, and the quantizer 384 illustrated in FIG. 13.

Figure 15:
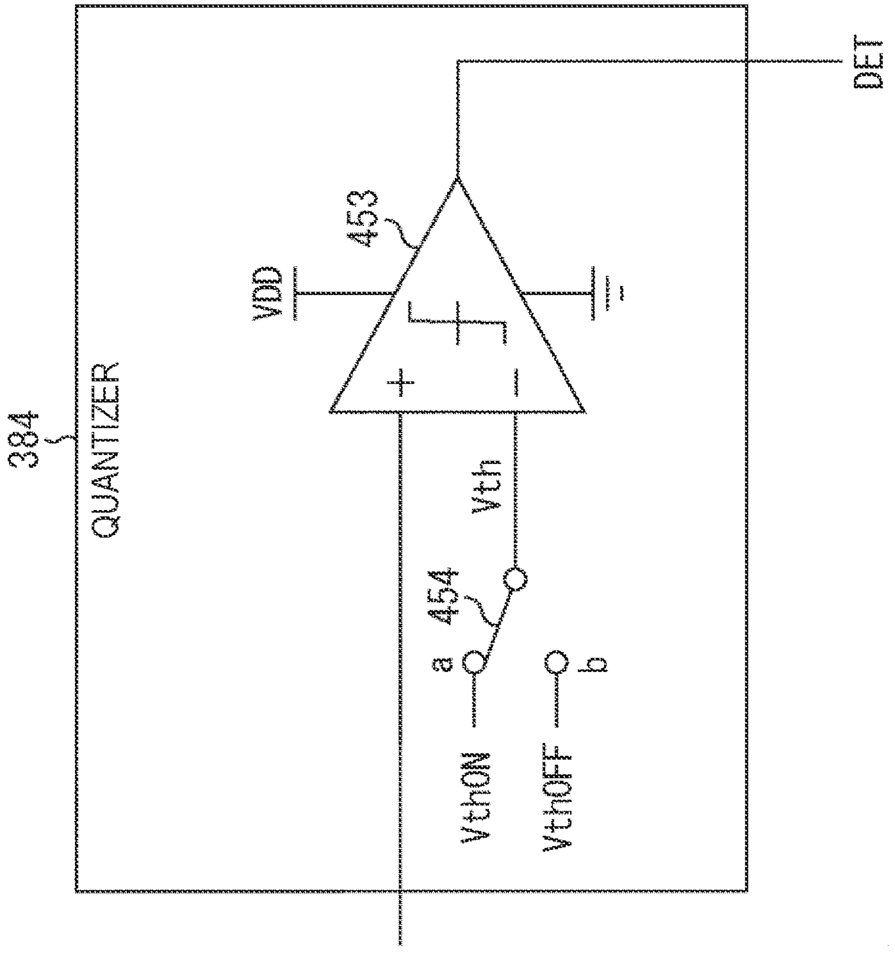
FIG. 15 is a circuit diagram illustrating another configuration example of the quantizer.

FIG. 15 is a circuit diagram illustrating another configuration example of the quantizer 384.

The quantizer 384 illustrated in FIG. 14 constantly compares the difference signal Vdiff from the subtractor 383 with both the positive-side threshold value (voltage) Vrefp and the negative-side threshold value (voltage) Vrefn, and outputs a comparison result.

On the other hand, the quantizer 384 in FIG. 15 includes one comparator 453 and a switch 454, and outputs a comparison result of comparison with any one of two threshold values (voltages) VthON and VthOFF switched by the switch 454.

The switch 454 is connected to an inverting input terminal (−) of the comparator 453, and selects a terminal a or b in accordance with a control signal from the drive unit 342. The voltage VthON as a threshold value is supplied to the terminal a, and the voltage VthOFF (<VthON) as a threshold value is supplied to the terminal b. Therefore, the voltage VthON or VthOFF is supplied to the inverting input terminal of the comparator 453.

The comparator 453 compares the difference signal Vdiff from the subtractor 383 with the voltage VthON or VthOFF, and outputs a detection signal DET of an H-level or an L-level indicating a result of the comparison to the transfer circuit 385 as a quantized value of the difference signal Vdiff.

Figure 16:
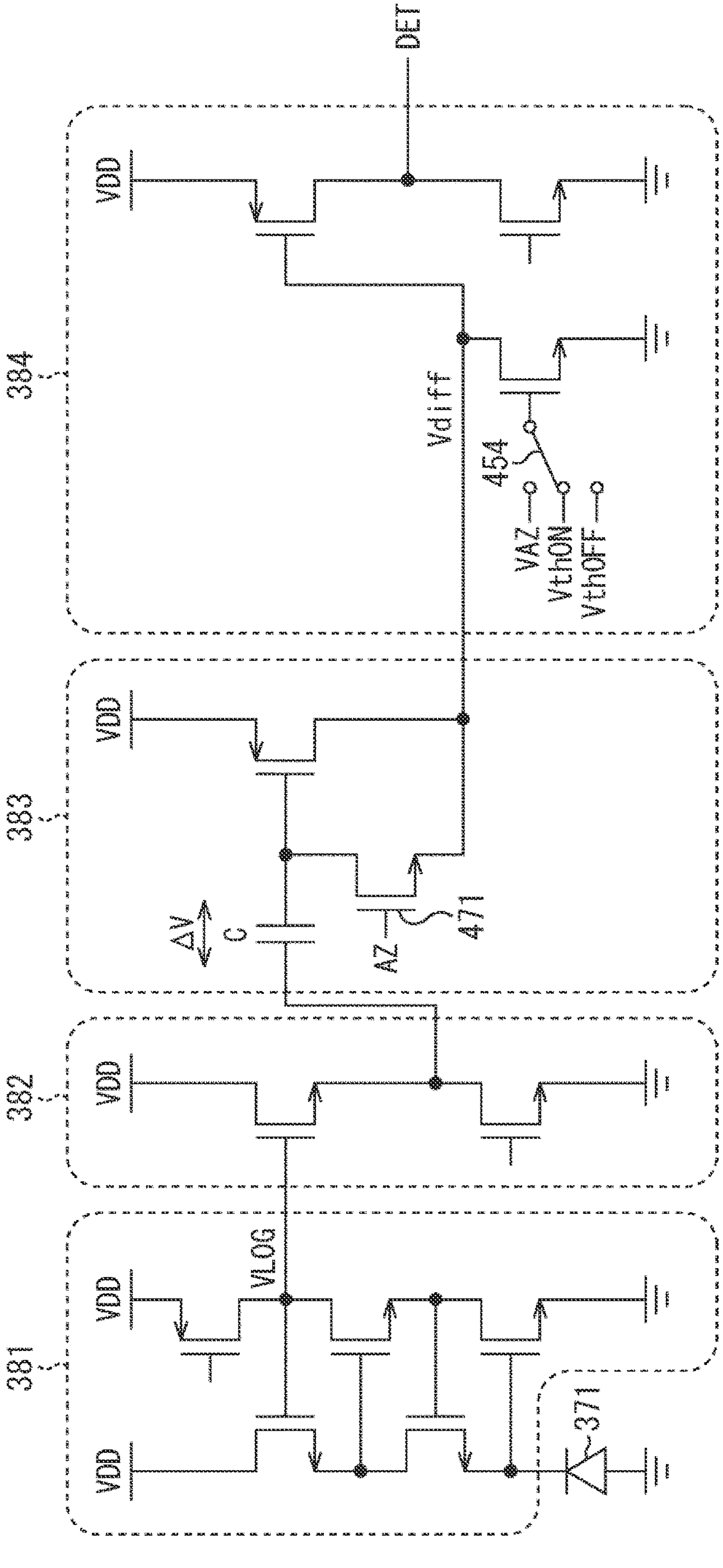
FIG. 16 is a diagram illustrating a more detailed circuit configuration example of the address event detection circuit in a case where the quantizer of FIG. 15 is adopted.

FIG. 16 illustrates a more detailed circuit configuration example of the current-voltage conversion circuit 381, the buffer 382, the subtractor 383, and the quantizer 384 in a case where the quantizer 384 illustrated in FIG. 15 is adopted.

In the circuit configuration of FIG. 16, a terminal VAZ for initialization (AutoZero) is also added as a terminal of the switch 454 in addition to the voltage VthON and the voltage VthOFF. At a timing when an H (High) level initialization signal AZ is supplied to a gate of an FET 471 that is an N-type MOS (NMOS) FET in the subtractor 383, the switch 454 of the quantizer 384 selects the terminal VAZ and executes an initialization operation. Thereafter, the switch 454 selects the terminal of the voltage VthON or the terminal of the voltage VthOFF on the basis of a control signal from the drive unit 342, and a detection signal DET indicating a result of comparison with the selected threshold value is output from the quantizer 384 to the transfer circuit 385.

Maintenance timing determination processing and threshold value update processing in the second embodiment are similar to those in the first embodiment described above, except that the maintenance timing determination processing and the threshold value update processing are not executed by the information processing apparatus 12 but are executed by the EVS camera 300 itself. Therefore, it is possible to detect, as an event, the spark 24 and the coolant liquid 23 generated during grinding and to accurately tell a maintenance timing.

8. Conclusion

According to the embodiments of the information processing system 1 described above, it is possible to more easily determine a maintenance timing by using an event sensor (the EVS camera 11 or the EVS camera 300) that detects a change in luminance of the spark 24 or the like as an event and asynchronously outputs the event. Furthermore, the event threshold value can be dynamically changed depending on an event detection status.

Although the example in which the machine tool 21 is a grinding machine has been described in the above embodiments, the machine tool 21 may be a machine that performs any processing such as cutting, grinding, cutting off, forging, or bending.

9. Computer Configuration Example

The series of processing executed by the information processing apparatus 12 described above can be executed by hardware or software. In a case where the series of processing is executed by software, a program constituting the software is installed in a computer. Here, examples of the computer include, for example, a microcomputer that is built in dedicated hardware, a general-purpose personal computer that can perform various functions by being installed with various programs, and the like.

Figure 17:
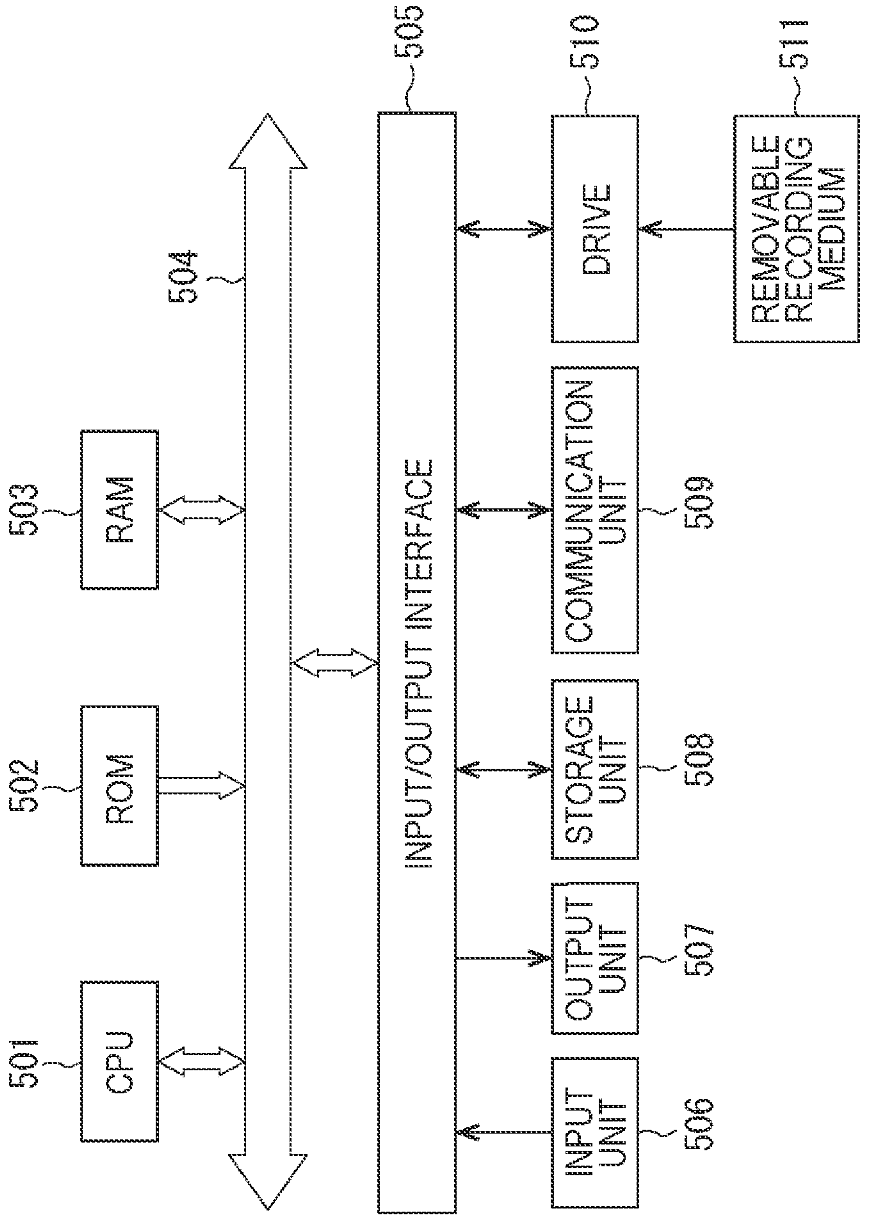
FIG. 17 is a block diagram illustrating a configuration example of hardware of a computer.

FIG. 17 is a block diagram illustrating a configuration example of hardware of a computer as an information processing apparatus that executes the above-described series of processing by a program.

In the computer, a central processing unit (CPU) 501, a read only memory (ROM) 502, and a random access memory (RAM) 503 are mutually connected by a bus 504.

An input/output interface 505 is further connected to the bus 504. An input unit 506, an output unit 507, a storage unit 508, a communication unit 509, and a drive 510 are connected to the input/output interface 505.

The input unit 506 includes a keyboard, a mouse, a microphone, a touch panel, an input terminal, and the like. The output unit 507 includes a display, a speaker, an output terminal, and the like. The storage unit 508 includes a hard disk, a RAM disk, a nonvolatile memory, and the like. The communication unit 509 includes a network interface or the like. The drive 510 drives a removable recording medium 511 such as a magnetic disk, an optical disk, a magneto-optical disk, or a semiconductor memory.

In the computer configured as described above, for example, the CPU 501 loads the program stored in the storage unit 508 into the RAM 503 via the input/output interface 505 and the bus 504 and executes the program, to thereby perform the above-described series of processing. The RAM 503 also appropriately stores data necessary for the CPU 501 to execute various processes, for example.

A program executed by the computer (CPU 501) can be provided by being recorded on the removable recording medium 511 as a package medium, or the like, for example. Also, the program may be provided by means of a wired or wireless transmission medium such as a local region network, the Internet, and digital broadcasting.

In the computer, by attaching the removable recording medium 511 to the drive 510, the program can be installed in the storage unit 508 via the input/output interface 505. Furthermore, the program can be received by the communication unit 509 via a wired or wireless transmission medium, and installed in the storage unit 508. In addition, the program can be installed in the ROM 502 or the storage unit 508 in advance.

Note that the program executed by the computer may be a program for processing in time series in the order described in the present description, or a program for processing in parallel or at a necessary timing such as when a call is made.

The embodiments of the present technology are not limited to the above-described embodiments, and various modifications can be made without departing from the gist of the present technology.

For example, a form in which all or some of the plurality of embodiments described above are combined can be appropriately adopted.

Also, each step described in the above-described flowchart may be executed by one device or executed by a plurality of devices in a shared manner.

Furthermore, when a plurality of processes is included in one step, a plurality of processes included in one step may be executed by one device or by a plurality of devices in a shared manner.

Note that the effects described in the present description are merely examples and are not limited, and effects other than those described in the present description may be provided.

Note that the present technology can have the following configurations.

(1)

An information processing apparatus including a state estimation unit that estimates a state of a grindstone by using event data supplied from an event sensor that outputs, as event data, a temporal change of an electrical signal obtained by photoelectrically converting an optical signal, and outputs a result of the estimation.

(2)

The information processing apparatus according to (1), in which the state estimation unit estimates the state of the grindstone by using the event data in which a spark generated between the grindstone and a workpiece is captured, and outputs a result of the estimation.

(3)

The information processing apparatus according to (1) or (2), in which the state estimation unit estimates the state of the grindstone on the basis of a feature amount of the event data, and outputs a result of the estimation.

(4)

The information processing apparatus according to (3), in which the feature amount of the event data is an event rate.

(5)

The information processing apparatus according to (3), further including an image generation unit that generates an event image from the event data, in which the feature amount of the event data is a feature amount detected from the event image.

(6)

The information processing apparatus according to (5), in which the feature amount of the event data includes at least one of the number of sparks, a size of a spark, a speed of the spark, a flight distance of the spark, or a flight angle of the spark.

(7)

The information processing apparatus according to (5) or (6), in which the feature amount of the event data includes at least one of the number of droplets of a coolant liquid, a size of a droplet of the coolant liquid, or a speed of the droplet of the coolant liquid.

(8)

The information processing apparatus according to any one of (1) to (7), in which the state estimation unit outputs an alert on the basis of the result of the estimation.

(9)

The information processing apparatus according to any one of (1) to (8), in which the state estimation unit adjusts an event threshold value on the basis of the event data in parallel with the processing of estimating the state of the grindstone.

(10)

The information processing apparatus according to any one of (1) to (9), in which the state estimation unit estimates the state of the grindstone by using a learning model generated by machine learning using the event data, and outputs a result of the estimation.

(11)

The information processing apparatus according to any one of (1) to (10), in which the state estimation unit estimates the state of the grindstone by using sensor data acquired by an external sensor and the event data, and outputs a result of the estimation.

REFERENCE SIGNS LIST

1 Information processing system
11 EVS camera
12 Information processing apparatus
13 Display
14 External sensor
21 Machine tool
22 Grindstone
23 Coolant liquid
24 Spark
50 Data acquisition unit
51 Event data processing unit
52 Event data storage unit
53 Image generation unit
54 Image storage unit
55 Image data processing unit
56 Grindstone state estimation unit
57 Camera setting change unit
58 Feature amount storage unit
59 Output unit
300 EVS camera
311 Optical unit
312 Imaging element
313 Control unit
314 Data processing unit
321 Event data processing unit
322 Recording unit
501 CPU
502 ROM
503 RAM
508 Storage unit

The invention claimed is:

1. An information processing apparatus comprising:

a memory storing a program, and at least one processor configured to execute the program to perform operations comprising:

estimating a state of a grindstone by using event data supplied from an event sensor that outputs, as event data, a temporal change of an electrical signal obtained by photoelectrically converting an optical signal;

adjusting an event threshold value used by the event sensor on a basis of the event data in parallel with estimating the state of the grindstone; and outputting a result of estimating the state of the grindstone.

2. The information processing apparatus according to claim 1, wherein the operations further comprise:

estimating the state of the grindstone by using the event data in which a spark generated between the grindstone and a workpiece is captured.

3. The information processing apparatus according to claim 1, wherein the operations further comprise:

estimating the state of the grindstone on a basis of a feature amount of the event data.

4. The information processing apparatus according to claim 3, wherein the feature amount of the event data is an event rate.

5. The information processing apparatus according to claim 3, wherein the operations further comprising:

generating an event image from the event data, wherein the feature amount of the event data is a feature amount detected from the event image.

6. The information processing apparatus according to claim 5, wherein the feature amount of the event data includes at least one of a number of sparks, a size of a spark, a speed of the spark, a flight distance of the spark, or a flight angle of the spark.

7. The information processing apparatus according to claim 5, wherein the feature amount of the event data includes at least one of a number of droplets of a coolant liquid, a size of a droplet of the coolant liquid, or a speed of the droplet of the coolant liquid.

8. The information processing apparatus according to claim 1, wherein the operations further comprise:

outputting an alert on a basis of the result of estimating the state of the grindstone.

9. The information processing apparatus according to claim 1, wherein the operations further comprise:

estimating the state of the grindstone by using a learning model generated by machine learning using the event data.

10. The information processing apparatus according to claim 1, wherein the operations further comprise:

estimating the state of the grindstone by using sensor data acquired by an external sensor and the event data.

11. A non-transitory computer readable medium storing a program, the program being executable by a processor to perform operations comprising:

estimating a state of a grindstone by using event data supplied from an event sensor that outputs, as event data, a temporal change of an electrical signal obtained by photoelectrically converting an optical signal;

adjusting an event threshold value used by the event sensor on a basis of the event data in parallel with estimating the state of the grindstone; and outputting a result of estimating the state of the grindstone.

12. The non-transitory computer readable medium according to claim 11, wherein the operations further comprise:

estimating the state of the grindstone by using the event data in which a spark generated between the grindstone and a workpiece is captured.

13. The non-transitory computer readable medium according to claim 11, wherein the operations further comprise:

estimating the state of the grindstone on a basis of a feature amount of the event data.

14. The non-transitory computer readable medium according to claim 13, wherein the feature amount of the event data is an event rate.

15. The non-transitory computer readable medium according to claim 13, wherein the operations further comprising:

generating an event image from the event data, wherein the feature amount of the event data is a feature amount detected from the event image.

16. The non-transitory computer readable medium according to claim 15, wherein the feature amount of the event data includes at least one of a number of sparks, a size of a spark, a speed of the spark, a flight distance of the spark, or a flight angle of the spark.

17. The non-transitory computer readable medium according to claim 15, wherein the feature amount of the event data includes at least one of a number of droplets of a coolant liquid, a size of a droplet of the coolant liquid, or a speed of the droplet of the coolant liquid.

18. The non-transitory computer readable medium according to claim 11, wherein the operations further comprise:

outputting an alert on a basis of the result of estimating the state of the grindstone.

19. The non-transitory computer readable medium according to claim 11, wherein the operations further comprise:

estimating the state of the grindstone by using a learning model generated by machine learning using the event data.

20. The non-transitory computer readable medium according to claim 11, wherein the operations further comprise:

estimating the state of the grindstone by using sensor data acquired by an external sensor and the event data.

* * * * *